United States Patent
Masuko et al.

(10) Patent No.: US 9,396,215 B2
(45) Date of Patent: Jul. 19, 2016

(54) SEARCH DEVICE, SEARCH METHOD, RECORDING MEDIUM, AND PROGRAM

(75) Inventors: Soh Masuko, Shinagawa-ku (JP); Jiro Tanaka, Tsukuba (JP); Shigaku Iwabuchi, Tsukuba (JP); Kenzo Nirasawa, Tsukuba (JP); Tatsuhito Oe, Tsukuba (JP)

(73) Assignee: Rakuten, Inc., Tokyo (JP)

( * ) Notice: Subject to any disclaimer, the term of this patent is extended or adjusted under 35 U.S.C. 154(b) by 186 days.

(21) Appl. No.: 14/346,523

(22) PCT Filed: Apr. 2, 2012

(86) PCT No.: PCT/JP2012/058964
§ 371 (c)(1),
(2), (4) Date: Mar. 21, 2014

(87) PCT Pub. No.: WO2013/046768
PCT Pub. Date: Apr. 4, 2013

(65) Prior Publication Data
US 2014/0236996 A1     Aug. 21, 2014

(30) Foreign Application Priority Data
Sep. 30, 2011  (JP) .................................. 2011-217443

(51) Int. Cl.
*G06F 17/30* (2006.01)
*G06F 3/01* (2006.01)
(Continued)

(52) U.S. Cl.
CPC ............ *G06F 17/30277* (2013.01); *G06F 3/01* (2013.01); *G06F 3/017* (2013.01);
(Continued)

(58) Field of Classification Search
USPC ........................... 707/758, 769, 776; 382/103
See application file for complete search history.

(56) References Cited

U.S. PATENT DOCUMENTS

2007/0042800 A1  2/2007  Tani
2010/0199228 A1  8/2010  Latta et al.
(Continued)

FOREIGN PATENT DOCUMENTS

JP          07210608 A    8/1995
JP       2006-260269 A    9/2006
(Continued)

OTHER PUBLICATIONS

Christian Holz et al. ("Data Mining: Inferring spatial Object Descriptions from Human Gesture", May 7-12, 2011, Vancouver, BC, Canada).*
(Continued)

*Primary Examiner* — Hung T Vy
(74) *Attorney, Agent, or Firm* — Sughrue Mion, PLLC

(57) ABSTRACT

A search device (101) obtains a specified length to be specified in a search query based on a position of an object having such a position set in accordance with the intent of a user. A detector (102) detects respective positions of multiple objects changing the respective positions in accordance with the intent of the user in a real space. A calculator (103) calculates a specified length on the basis of the intent of the user based on the detected positions of the multiple objects. A searcher (104) searches for product records having a product size satisfying a search condition based on the calculated specified length from a product database managing product records each containing at least a product size and a product image. A display (105) displays on a screen the product image of the searched product record.

26 Claims, 18 Drawing Sheets

(51) Int. Cl.
- *G06F 3/048* (2013.01)
- *G06T 7/00* (2006.01)
- *G06K 9/00* (2006.01)
- *G06Q 30/06* (2012.01)

(52) U.S. Cl.
CPC ......... *G06F 3/048* (2013.01); *G06F 17/30259* (2013.01); *G06F 17/30539* (2013.01); *G06K 9/00375* (2013.01); *G06Q 30/0621* (2013.01); *G06T 7/0042* (2013.01); *G06F 2216/03* (2013.01); *G06T 2207/30196* (2013.01)

(56) References Cited

U.S. PATENT DOCUMENTS

| | | | |
|---|---|---|---|
| 2010/0303289 A1* | 12/2010 | Polzin | A63F 13/06 382/103 |
| 2011/0216075 A1 | 9/2011 | Shigeta et al. | |
| 2013/0110666 A1* | 5/2013 | Aubrey | G06Q 30/0641 705/26.5 |

FOREIGN PATENT DOCUMENTS

| | | |
|---|---|---|
| JP | 2010-9558 A | 1/2010 |
| JP | 2010-15228 A | 1/2010 |
| JP | 2011-90407 A | 5/2011 |
| JP | 2011-186730 A | 9/2011 |

OTHER PUBLICATIONS

Christian Holz, et al., "Data Miming: Inferring Spatial Object Descriptions from Human Gesture", CHI 2011 Proceedings of the 2011 annual conference on Human factors in computing systems, ACM, May 7, 2011, pp. 811-820.

* cited by examiner

SEARCH DEVICE, SEARCH METHOD, RECORDING MEDIUM, AND PROGRAM

CROSS REFERENCE TO RELATED APPLICATIONS

This application is a National Stage of International Application No. PCT/JP2012/058964, filed on Apr. 2, 2012, which claims priority from Japanese Patent Application No. 2011-217443, filed on Sep. 30, 2011, the contents of all of which are incorporated herein by reference in their entirety.

TECHNICAL FIELD

The present invention relates to a search device, a search method, a recording medium, and a program which obtain a specified size to be specified for a search query based on the position of an object having such a position set in accordance with a user's intent like the hands of the user.

BACKGROUND ART

Conventionally, technologies have been proposed which allow a user to enter a size condition in order to search for a product with a size desired by the user. For example, Patent Literature 1 to be mentioned later discloses a product search for system that allows a user to directly enter values of a width, a depth, and a height of a product, and searches for a product matching such width, depth, and height.

Conversely, technologies have been conventionally proposed which detect a position of each joint of the body of a human. For example, Patent Literature 2 to be mentioned later discloses a technology of detecting a gesture obtained when a human takes predetermined still posture and motion through a camera which can detect a depth, and enters various kinds of instructions.

CITATION LIST

Patent Literature

Patent Literature 1: Unexamined Japanese Patent Application Kokai Publication No. 2010-015228
Patent Literature 2: U.S. Patent Application Publication No. 2010/0199228

SUMMARY OF INVENTION

Technical Problem

A human often figures out various lengths based on a relative relationship with the body of such a human. Hence, it is often difficult for a human to understand an actual length from a numerical value, and to directly obtain a numerical value representing a length.

Therefore, there is a strong demand for a technology that allows a human to set the desired size of a product intuitively based on the relative relationship with the body of the human, and searches for a product.

The present invention is to address such technical problems, and it is an object of the present invention to provide a search device, a search method, a recording medium, and a program which obtain a specified length to be specified for a search query based on the position of an object having such a position set in accordance with a user's intent like the hand of the user.

Solution to Problem

A search device according to a first aspect of the present invention includes: a detector that detects respective positions of a plurality of objects changing the respective positions based on an intent of a user in a real space; a calculator that calculates a specified length on a basis of the intent of the user in accordance with the detected positions of the plurality of objects; a searcher that searches for a product record with a product size satisfying a search condition based on the calculated specified length from a product database managing a product record containing at least the product size and a product image; and a display that displays on a screen the product image of the searched product record.

In the search device of the present invention, a number of the plurality of objects may be two; the detector may detect, as the respective positions of the plurality of objects, positions in a horizontal direction and positions in a vertical direction; the calculator may calculate, as the specified length on the basis of the intent of the user, a horizontal length representing a distance between the two objects in the horizontal direction, and a vertical length representing a distance between the two objects in the vertical direction based on the detected positions of the two objects; the product size may include a product width and a product height; the searcher may set a horizontal range covering the horizontal length, and a vertical range covering the vertical length; the searcher may determine whether or not a number of product records where the product has a width within the horizontal range and where the product has a height within the vertical range is quite fewer than a number of product records where the product has a width within the horizontal range based on whether or not a preset small-number condition is satisfied; the searcher: (a) may take the product record having the product width within the horizontal range and having the product height within the vertical range as a search result when the small-number condition is not satisfied; and (b) may take the product record having the product width within the horizontal range as a search result when the small-number condition is satisfied.

In the search device of the present invention, a number of the plurality of objects may be two; the detector may detect, as the respective positions of the plurality of objects, positions in a horizontal direction; the calculator may calculate, as the specified length on the basis of the intent of the user, a horizontal length representing a distance between the plurality of objects in the horizontal direction; the product size may include a product width; and the searcher may set a horizontal range covering the horizontal length, and search the product record having the product width within the horizontal range.

In the search device of the present invention, a number of the plurality of objects may be two; the detector may detect, as the respective positions of the plurality of objects, positions in a vertical direction; the calculator may calculate, as the specified length on the basis of the intent of the user, a vertical length representing a distance between the plurality of objects in the vertical direction; the product size may include a product height; and the searcher may set a vertical range covering the vertical length, and search the product record having the product height within the vertical range.

In the search device of the present invention, a number of the plurality of objects may be two; the detector may detect, as the respective positions of the plurality of objects, positions in a horizontal direction and positions in a vertical direction; the calculator may calculate, as the specified length on the basis of the intent of the user, a horizontal length representing a distance between the plurality of objects in the horizontal direction, and a vertical length representing a distance between the plurality of objects in the vertical direction; the product size may include a product width and a product height; and the searcher may set a horizontal range covering the horizontal length, and a vertical range covering the vertical length, and, search the product record having the product width within the horizontal rang and having the product height within the vertical range.

In the search device of the present invention, a number of the plurality of objects may be two; the detector may detect, as the respective positions of the plurality of objects, positions in a horizontal direction, positions in a vertical direction, and positions in a depth direction; the calculator may calculate, as the specified length on the basis of the intent of the user, a horizontal length representing a distance between the plurality of objects in the horizontal direction, a vertical length representing a distance between the plurality of objects in the vertical direction, and a depth length representing a distance between the plurality of objects in the depth direction; the product size may include a product width, a product height, and a product depth; and the searcher may set a horizontal range covering the horizontal length, a vertical range covering the vertical length, and a vertical range covering the depth length, and, search the product record having the product width within the horizontal range, the product height within the vertical range, and the product depth within the depth range.

In the search device of the present invention, the display may display the product image in an enlarge/scaled-down manner at an enlargement/scale-down ratio associated with the specified length.

In the search device of the present invention, the plurality of objects may be both hands of the user; and the display may display on the screen a captured image from real space, estimates positions where both hands of the user are imaged within the captured image displayed in the screen based on the detected positions, and causes the product image contained in the searched product record to be fit so as to be held between the estimated positions to display the product image.

In the search device of the present invention, the plurality of objects may be both hands of the user; and the display may display in the screen a captured image from real space, estimates positions where both hands of the user are imaged in the captured image displayed in the screen based on the detected positions, and displays markings at the estimated positions.

In the search device of the present invention, when the estimated position changes, the display may display an image lag of the marking for a predetermined time at the position prior to the change.

In the search device of the present invention, the detector may detect a depth position of the user; and the display may cause the captured image to be enlarged/scaled-down at an enlargement/scale-down ratio in accordance with the depth position of the user, and display the enlarged/scaled-down image in the screen.

In the search device of the present invention, the detector may detect the positions of the plurality of objects based on the captured image; and the searcher may estimate an attribute of the user based on a posture of the user in the captured image, and perform search refinement on the product records based on product purchase histories of users having the estimated attribute.

In the search device of the present invention, the plurality of objects may be both hands of two users, respectively; distances in a horizontal direction between both hands of the two users, distances in a vertical direction, and distances in a depth direction may be obtained based on detected positions of both hands of the two users in the horizontal direction, the vertical direction, and the depth direction; a greater distance in the obtained distances in the horizontal direction may be calculated as a horizontal length; a greater distance in the obtained distances in the vertical direction may be calculated as a vertical length; a greater distance in the obtained distances in the depth direction may be calculated as a depth length; the product size may include a product width, a product height and a product depth; the searcher may set a horizontal range covering the horizontal length, set a vertical range covering the vertical length, and set a depth range covering the depth length; and the searcher may search the product record having the product width within the horizontal range, the product height within the vertical range, and the product depth within the depth range.

In the search device of the present invention, the searcher may set a specified range covering the specified length, and search the product record having the product size within the specified range from the product database; and the display may further display the specified range in the screen.

In the search device of the present invention, the searcher may set a specified range covering the specified length based on a size of an area where the position detected by the detector has moved within a latest predetermined time, and search the product record having the product size within the specified range.

In the search device of the present invention, the display may display, for a predetermined time, an image lag of the product image of the product record excluded from a search result when the searchers starts over searching.

In the search device of the present invention, the specified length may be calculated within a predetermined degree of precision; and the searcher may search again the product record every time the calculated specified length changes and the search condition changes.

In the search device of the present invention, when the product record is searched again, information indicating an increase/decrease in a number of the searched product records may be further displayed in the screen.

In the search device of the present invention, a number of the plurality of objects may be two; the detector may detect, as the respective positions of the plurality of objects, positions in a first direction and positions in a second direction; the calculator may calculate, as the specified length on the basis of the intent of the user, a first length representing a distance between the two objects in the first direction, and a second length representing a distance between the two objects in the second direction based on the detected positions of the two objects; the product size may include a first product length and a second product length; the searcher may set a first range covering the first length, and a second range covering the second length; the searcher may determine whether or not a number of product records having the first length within the first range is much bigger based on whether or not a preset large-number condition is satisfied; the searcher: (a) may take the product record having the first length within the first range as a search result when the large-number condition is not satisfied; and (b) may take the product record having the first length within the first range and having the second length within the second range as a search result when the large-number condition is satisfied.

In the search device of the present invention, the display may display at least one piece of information on a maximum value of the product size of the product record managed by the database and information on a minimum value thereof in the screen.

In the search device of the present invention, the display may display information on a direction of the specified length under the search condition in the screen.

A search method according to a second aspect of the present invention includes: a detecting step for detecting respective positions of a plurality of objects changing the respective positions based on an intent of a user in a real space; a calculating step for calculating a specified length on a basis of the intent of the user in accordance with the detected positions of the plurality of objects; a searching step for searching a product record with a product size satisfying a search condition based on the calculated specified length from a product database managing a product record containing at least the product size and a product image; and a displaying step for displaying on a screen the product image of the searched product record.

A non-transitory computer-readable recording medium having recorded therein a program according to a third aspect of the present invention causes a computer to function as: a detector that detects respective positions of a plurality of objects changing the respective positions based on an intent of a user in a real space; a calculator that calculates a specified length on a basis of the intent of the user in accordance with the detected positions of the plurality of objects; a searcher that searches for a product record with a product size satisfying a search condition based on the calculated specified length from a product database managing a product record containing at least the product size and a product image; and a display that displays on a screen the product image of the searched product record.

A program according to a fourth aspect of the present invention causes a computer to function as: a detector that detects respective positions of a plurality of objects changing the respective positions based on an intent of a user in a real space; a calculator that calculates a specified length on a basis of the intent of the user in accordance with the detected positions of the plurality of objects; a searcher that searches for a product record with a product size satisfying a search condition based on the calculated specified length from a product database managing a product record containing at least the product size and a product image; and a display that displays on a screen the product image of the searched product record.

The program of the present invention can be recorded in a computer-readable non-transitory recording medium, such as a compact disc, a flexible disc, a hard disk, a magneto-optical disc, a digital video disk, a magnetic tape or a semiconductor memory. In addition, such a recording medium can be distributed and sold separately from a computer.

In addition, the program of the present invention can be loaded in a computer-readable/writable recording medium like a RAM from the aforementioned recording medium, temporary recorded therein, and allow a CPU (Central Processing Unit) to read, interpret and execute the program recorded in the RAM or the like.

Still further, the program of the present invention can be distributed and sold through a transitory propagation medium like a computer communication network separately from a computer that runs the program.

Advantageous Effects of Invention

According to the present invention, it becomes possible to provide a search device, a search method, a recording medium, and a program which obtain a specified length to be specified for a search query based on the position of an object having such a position set in accordance with a user's intent like the hand of the user.

DESCRIPTION OF EMBODIMENTS

Embodiments of the present invention will be explained below. The embodiments are presented for explanation purposes, and are not for limiting the scope and spirit of the present invention. Hence, a person skilled in the art can adopt embodiments in which each or all elements of the foregoing embodiments are replaced with equivalents, and such embodiments should be within the scope and spirit of the present invention.

First Embodiment

A search device according to the present invention can be realized by allowing various computers like a gaming entertainment terminal and a personal computer to run a predetermined program.

In this case, the term computer means a hardware that utilizes a RAM as a temporary memory area or an output destination of a process result when a CPU runs the program, accepts an instruction from a user through input devices like a keyboard and a mouse, outputs a process result to an output device like a display, and realizes the aforementioned input/output through a communication with another apparatus via an NIC (Network Interface Card), and the input/output devices can be omitted as needed.

A hard disk or the like of the computer records, in addition to the program run by the CPU, a database accumulating records representing various information to be processed by the CPU. The CPU executes processes of searching records matching a search query from the database, and adding a new record to the database.

In addition, upon application of technologies like FPGA (Field Programmable Gate Array), a design of an electronic circuit can be created based on a program, and an exclusive electronic circuit can be formed based on such a design to realize the search device of the present invention.

(Search Device)

Figure 1:
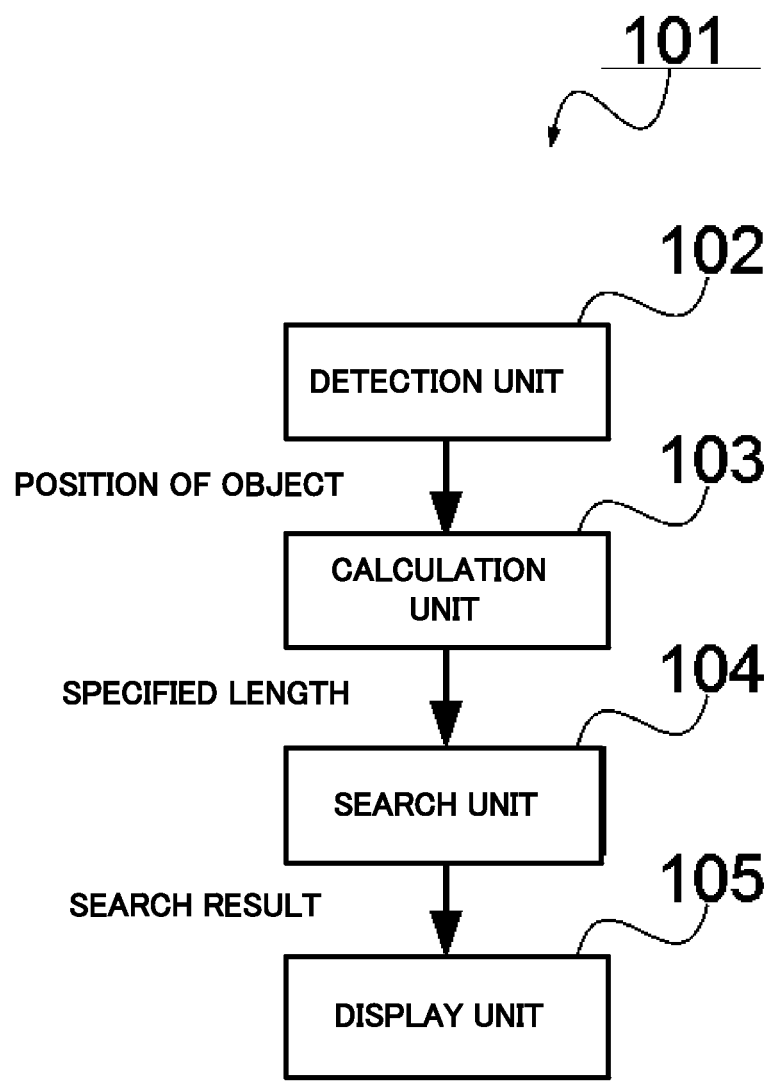
FIG. 1 is an explanatory diagram illustrating a general configuration of a search device according to an embodiment of the present invention.
Figure 2:
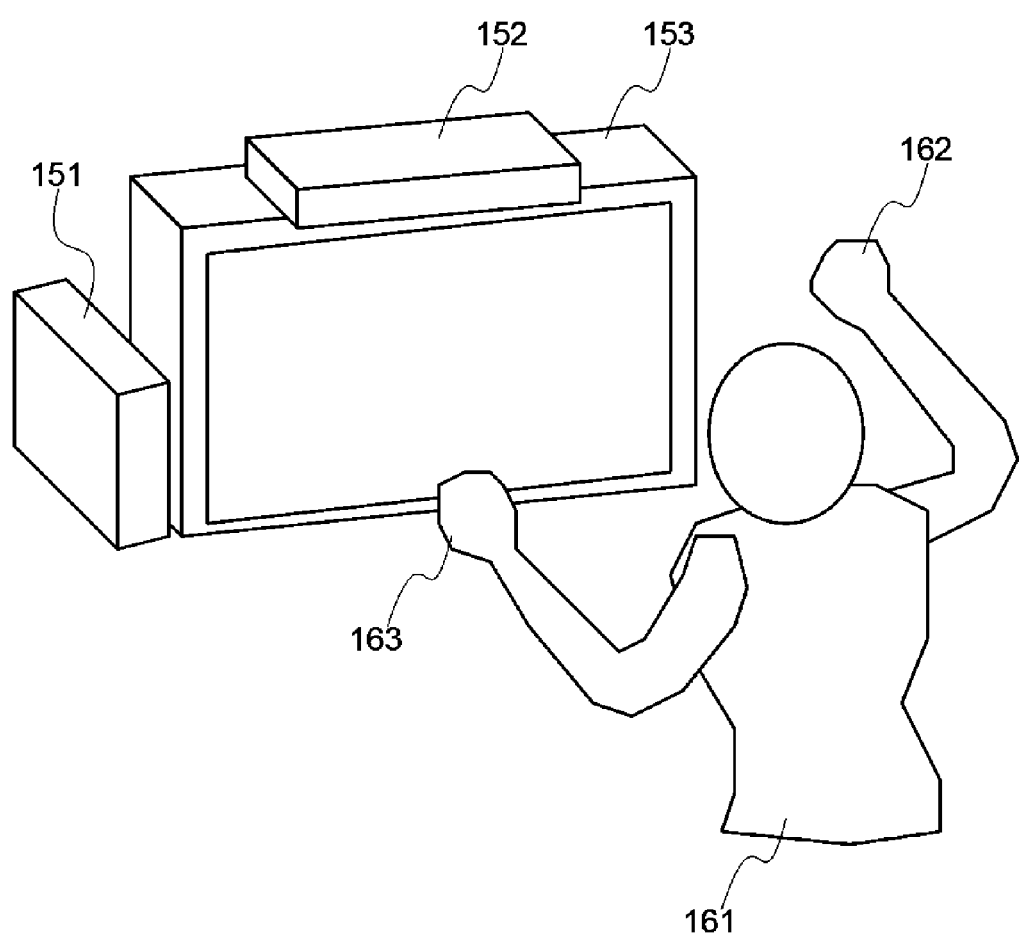
FIG. 2 is an explanatory diagram for explaining a positional relationship between a computer or the like that realizes the search device according to the embodiment of the present invention and a user.

FIG. 1 is an explanatory diagram illustrating a general structure of a search device according to an embodiment of the present invention. FIG. 2 is an explanatory diagram illustrating a positional relationship between a computer or the like realizing the search device of the embodiment of the present invention and a user. An explanation will be below given with reference to those drawings.

As illustrated in FIG. 1, a search device 101 includes a detector 102, a calculator 103, a searcher 104, and a display 105.

In this embodiment, as illustrated in FIG. 2, the search device 101 is realized by a computer 151 which is connected with a motion sensor 152 and a display 153 and which runs a predetermined program.

The position and posture of a user 161 is detected by the motion sensor 152, and the user 161 views a search result and the like displayed on the screen of the display 153.

In this case, the detector 102 detects respective positions of multiple objects that change the positions based on the intent of the user 161 in the real space.

The simplest objects as the multiple objects that change the positions based on the intent of the user 161 are a right hand 162 of the user 161 and a left hand 163 thereof. The positions of both hand of the user 161 in the real space are detectable through the motion sensor 152 that utilizes a camera which can detect a depth.

In addition, objects with a predetermined three-dimensional shape, such as a self-supported flag, a small pylon, a cigarette box, and a marker utilized in an AR (Augmented Reality) technology, are applicable as the object that changes the position based on the intent of the user. Application of the depth detection technology in the motion sensor 152 and various image recognition technologies enables a detection of such an object in the real space.

At this time, the color of the object (for example, a skin color of a hand, a red flag or pylon are applicable) is defined in advance, and an image recognition is performed based on the color, thereby enabling a high-speed and precise recognition.

Still further, when the number of objects having respective positions detected is greater than the number expected beforehand, for example, when four red flags that are originally two are recognized, a predetermined number of objects are selected in an order closer to the motion sensor 152, thereby eliminating an unnecessary recognition result.

As will be explained later, the number of objects can be changed as needed. In this embodiment, both hands of a user are utilized, and thus the number of objects having positions to be detected is two, but when respective both hands of two users are utilized, the number of objects having positions to be detected becomes four.

Conversely, the calculator 103 calculates a specified length on the basis of the intent of the user from the positions of the multiple detected objects.

The simplest scheme is to calculate a distance between the multiple objects in the real space, and the calculation result is taken as the specified length.

Figure 3:
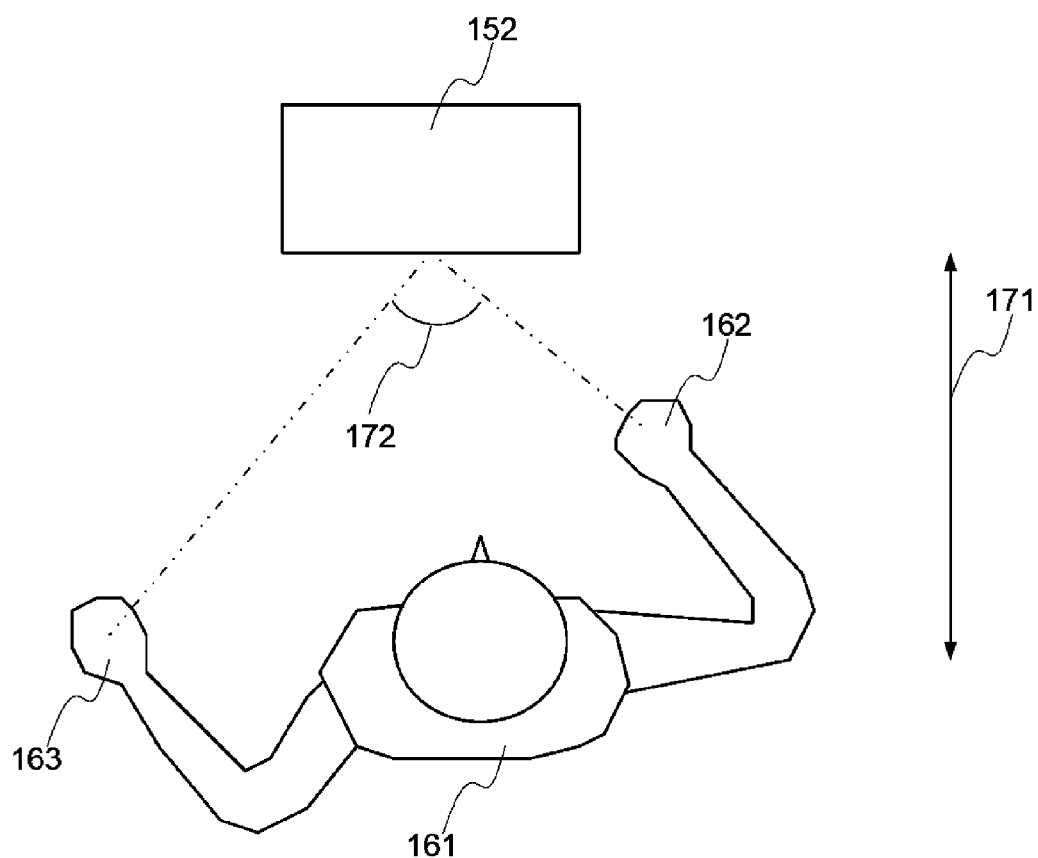
FIG. 3 is an explanatory diagram for explaining schemes of detecting the position of an object and of calculating a distance.

FIG. 3 is an explanatory diagram for explaining a scheme of detecting the position of the object and of calculating a distance. An explanation will be given below with reference to this drawing.

The motion sensor 152 measures a depth distance 171 between the user 161 and the motion sensor 152 using, for example, infrared rays.

In addition, the motion sensor 152 estimates the position of the right hand 162 and that of the left hand 163 in the captured image of the user 161 captured by the camera.

Subsequently, based on the constraint condition associated with human joints and bones, the three-dimensional positions of the right hand 162 and the left hand 163 in the real space are detected.

In addition, an angle 172 between the right hand 162, the motion sensor 152, and the left hand 163 is detectable based on a distance in the image between the right hand 162 and the left hand 163 therein. In this case, when it is approximated that the depth of the right hand 162, the depth of the left hand 163, that is, the distance between both hands and the motion sensor 152 is substantially equal to the depth distance 171, a distance (L) between the right hand 162 and the left hand 163 in the real space can be approximately calculated based on the depth distance 171 ($d$) and the angle 172 ($\theta$) as follow:

$$L = d \times \tan(\theta/2).$$

The number of the specified lengths to be calculated is not limited to one. Various specific examples of calculating a specified length based on the positions of multiple objects will be explained later.

Still further, the searcher 104 searches for a product record having a product size satisfying a search condition based on the calculated specified length from the product database managing the product records each having at least a product size and a product image.

The product record managed in the product database generally contains following information:

(1) Product ID (IDentifier)
(2) Product category
(3) Product name
(4) Product size represented by a width, a height, a depth, and the like of a product
(5) File name or URL (Universal Resource Locator) of product image representing external appearance of product
(6) Price of product
(7) URL supplying detailed information of product (8) Size information unique to product. For example, an inch number of diagonal lines in a television device, and a size indication like SS, S, M, L, LL, and XL of clothing.

When the product database is utilized in this manner, both hands of the user are utilized as the multiple objects, and a search condition in which an error between the width of the product and the specified length is within a predetermined threshold range is adopted, a product record having a similar width to the width expressed by the user using the hands can be searched.

Eventually, the display 105 displays the product image of the searched product record on the screen of the display 153.

The simplest way is that the product images associated with the product records that are search results are displayed on the screen arranged side by side as those are. In addition, a scheme of displaying the product images one by one in a slide show manner for each predetermined time within a predetermined area of the screen is also applicable.

Still further, the product image can be displayed on the screen in an enlarged/scaled down manner in accordance with the size of the specified length to give a feedback of the current specified length to the user, and to make the user to easily understand the relative size of the product.

It is desirable that a posture of the user 161 captured by the camera of the motion sensor 152 should be displayed on the screen in addition to the product image, and a marking should be displayed at the position of the object having such a position detected within the captured image, thereby giving a feedback to the user 161 with respect to the inputting of the specified length.

When, for example, the right hand of the user 161 and the left hand thereof are adopted as the objects, in the captured image of the user displayed on the screen, markings representing the right hand and the left hand, respectively, are displayed in a superimposed manner to a portion recognized as the right hand and a portion recognized as the left hand, it becomes possible for the user 161 to check whether or not the specified length is recognized as the user intends.

The following explanation will be given of an example case in which both hands of a user are taken as multiple objects, a distance in the horizontal direction between both hands is taken as a specified length, and a search condition in which the specified length and the width of a product are equal to or smaller than a predetermined threshold is applied.

(Search Process)

Figure 4:
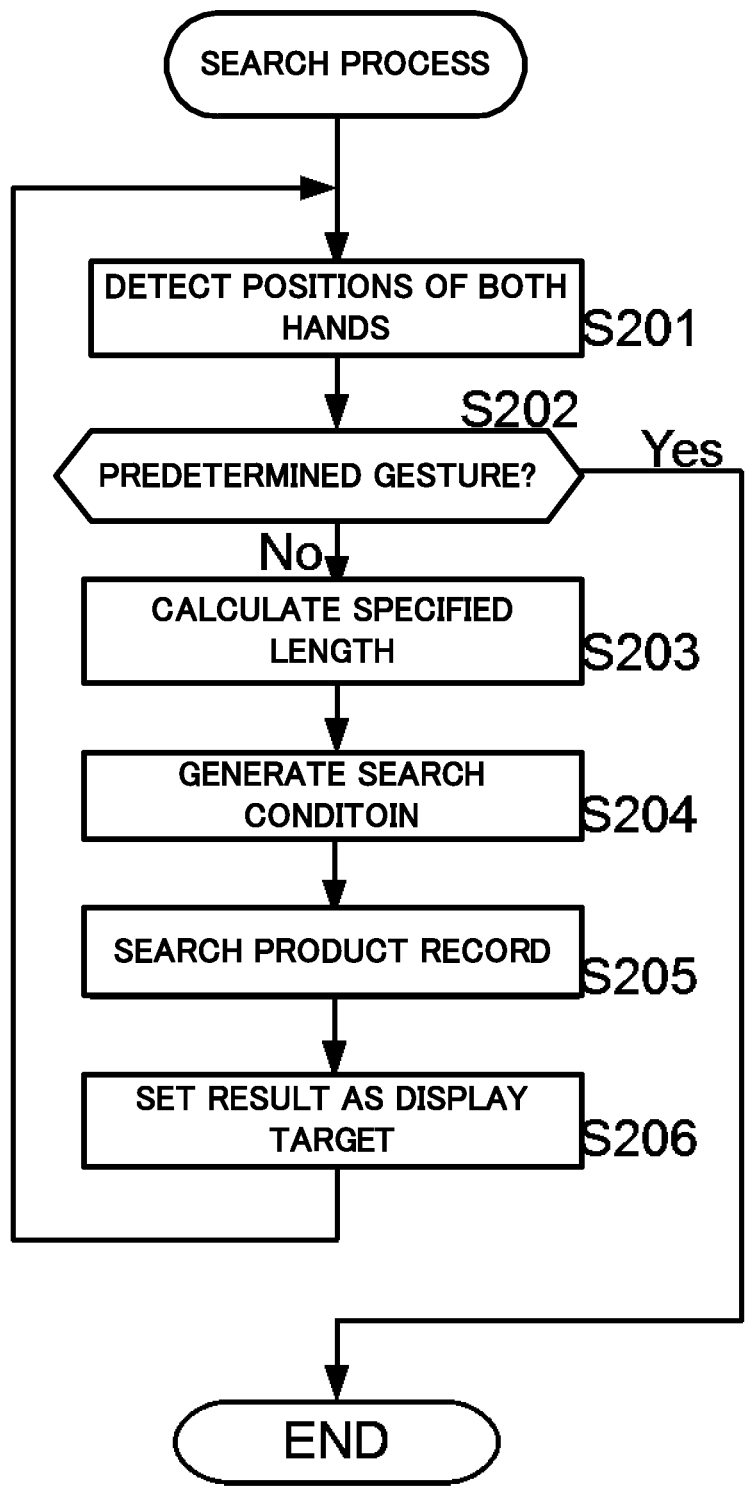
FIG. 4 is a flowchart illustrating a flow of a control through a search process executed by the search device according to the embodiment of the present invention.

FIG. 4 is a flowchart illustrating a flow of a control on a search process executed by the search device 101 of this embodiment. An explanation below will be given with reference to this figure.

When the user selects searching a product in a specific genre from the product database, this process starts. This corresponds to search "a product in a specific genre and satisfying a search condition defined based on a specified length" from "a product database registering all products".

For the selection of the genre, a conventionally well-known technology as disclosed in Patent Literature 2 and the like may be applied, or inputting technologies utilizing a keyboard, a mouse, a game controller and the like may be applied.

When this process starts, first, the CPU of the computer realizing the search device 101 detects (step S201) positions of both hands of the user, that is, the objects in the real space through the motion sensor and the like. Hence, under the control of the CPU, the motion sensor and the like function as the detector 102.

Next, the CPU refers to the history of the detected positions of both hands, and determines (step S202) whether or not the user is making a predetermined gesture. In this case, the predetermined gesture is a process of terminating the search process.

When the user is not making the predetermined gesture (step S202: NO), the CPU calculates (step S203) a specified length based on the detected positions of both hands. As explained above, in this embodiment, a distance in the horizontal direction between both hands in the real space is calculated, and a calculation result is taken as a specified length. Accordingly, the CPU functions as the calculator 103.

In addition, the CPU generates (step S204) a search condition based on the calculated specified length. As explained above, according to this embodiment, a search query is generated which represents that a difference between the specified length and the width of the product is equal to or smaller than the predetermined threshold, and this search query is taken as the search condition.

Next, the CPU searches for (step S205) a product record satisfying the search condition from the product database. Hence, the CPU functions as the searcher 104 together with the hard disk and the like recording the product records.

Subsequently, the CPU sets (step S206) the product image contained in the product record that is a search result as a display target on the screen, and returns the process to the step S201.

In this case, after the product image is set as the display target, in a displaying process executed in parallel with this process, the product image set as the display target is displayed on the screen accordingly.

The searching of the product records often brings about a large calculation load. Hence, a re-searching of the product record (step S205) and the setting of the product image as the display target (step S206) may be performed only when the search condition generated in the step S204 differs from the search condition generated previously.

Conversely, when it is determined (step S202: YES) that the user is making the predetermined gesture, this process is terminated.

The followings are example predetermined gestures.

(1) Gesture of moving both hands back and forth as viewed from the user. This corresponds to a gesture of moving both hands in the depth direction as viewed from the motion sensor.

(2) Gesture of having both hands still for a predetermined time.

(3) Gesture of hiding one hand. This is a gesture of, when the motion sensor is capturing an image of the posture of the user and the captured image is displayed within the screen, moving one hand off of the screen.

The predetermined gesture is not limited to the above examples. Any arbitrary gestures can be adopted as long as not interfering with a form of a specified length to be discussed later and a form of the range of the specified length.

When this process completes, in the repetition of steps S201 to S206, the specified length calculated at last, the search condition generated at last, and the product record reflecting the search result become the specified length, search condition, and product record desired by the user.

Hence, in various processes executed following to this process can have the last specified length, search condition and product record as process targets desired by the user.

(Form of Specified Length)

When both hands of the user are taken as the two objects, the following form can be employed as the specified length. In this case, it is presumed that the detected positions of both hands are expressed as (x1, y1, z1) and (x2, y2, z2) based on coordinate values in a three-dimensional orthogonal coordinate system having values in the horizontal direction, the vertical direction and the depth direction arranged as explained above.

First, there is a form in which one specified length is specified and such a specified length represents the width of a product. In this case, as the specified length, $|x2-x1|$ or $[(x2-x1)^2+(y2-y1)^2]^{1/2}$ can be adopted. This form is appropriate when a product size is specified for a product in a genre in which the aspect ratio of the size can be deemed as substantially constant.

Whether or not the specified length represents the width of a product can be determined based on whether or not $|x2-x1|$ is sufficiently greater than $|y2-y1|$, for example, whether or not the ratio of the latter to the former is equal to or greater than a predetermined threshold.

Next, there is a form in which one specified length is specified and such a specified length represents the height of the product.

In this case, as the specified length, $|y2-y1|$ or $[(x2-x1)^2+(y2-y1)^2]^{1/2}$ can be adopted. This form is appropriate when a product size is specified for a product in a genre in which the size in the height direction is important like the length of a skirt.

Whether or not the specified length represents the height of the product can be determined based on whether or not $|y2-y1|$ is sufficiently greater than $|x2-x1|$, for example, whether or not the ratio of the latter to the former is equal to or greater than a predetermined threshold.

In addition, there is a form in which one specified length is specified and such a specified length represents the length of a diagonal line of a product.

In this case, as the specified length, $[(x2-x1)^2+(y2-y1)^2]^{1/2}$ can be adopted. This form is appropriate when a product size is specified for a product in a genre in which the size of a diagonal line is important like a liquid crystal display or a television device.

Whether or not the specified length represents the length of a diagonal line of a product can be determined based on whether or not the ratio between $|y2-y1|$ and $|x2-x1|$ is, for example, within a range from 1:2 to 2:1, that is, whether or not the representing aspect ratio of the product in the expected genre is within a predetermined error range.

When the number of kinds of the specified length appropriate for the genre of the product is one (for example, in the case of the height of the product), regardless of the direction in which the user spreads both hands (for example, the user spreads both hands horizontally), the above-explained various distances indicated by both hands can be calculated as the specified length in a direction appropriate for the genre of the product.

For example, the length of a skirt is a length in the vertical direction, but when the search-target product database is limited to the product genre that is skirt, (for example, when the product database registers only skirts, or when the product genre is selected as skirt by the user in advance), either the longer distance of the distance between both hands in the vertical direction and the distance between both hands in the horizontal direction can be calculated as the specified length to the product height.

There is also a form in which two specified lengths are specified and such specified lengths represent a width of a product and a height thereof.

In this case, as the specified length corresponding to the width, and the specified length corresponding to the height, $|x2-x1|$ and $|y2-y1|$ can be adopted, respectively.

In addition, there is a form in which three specified lengths are specified and such specified lengths represents width, height, and depth of a product.

According to this form, as the specified length corresponding to the width, the specified length corresponding to the height, and the specified length corresponding to the depth, $|x2-x1|$, $|y2-y1|$, and $|z2-z1|$ can be adopted, respectively.

Figure 5:
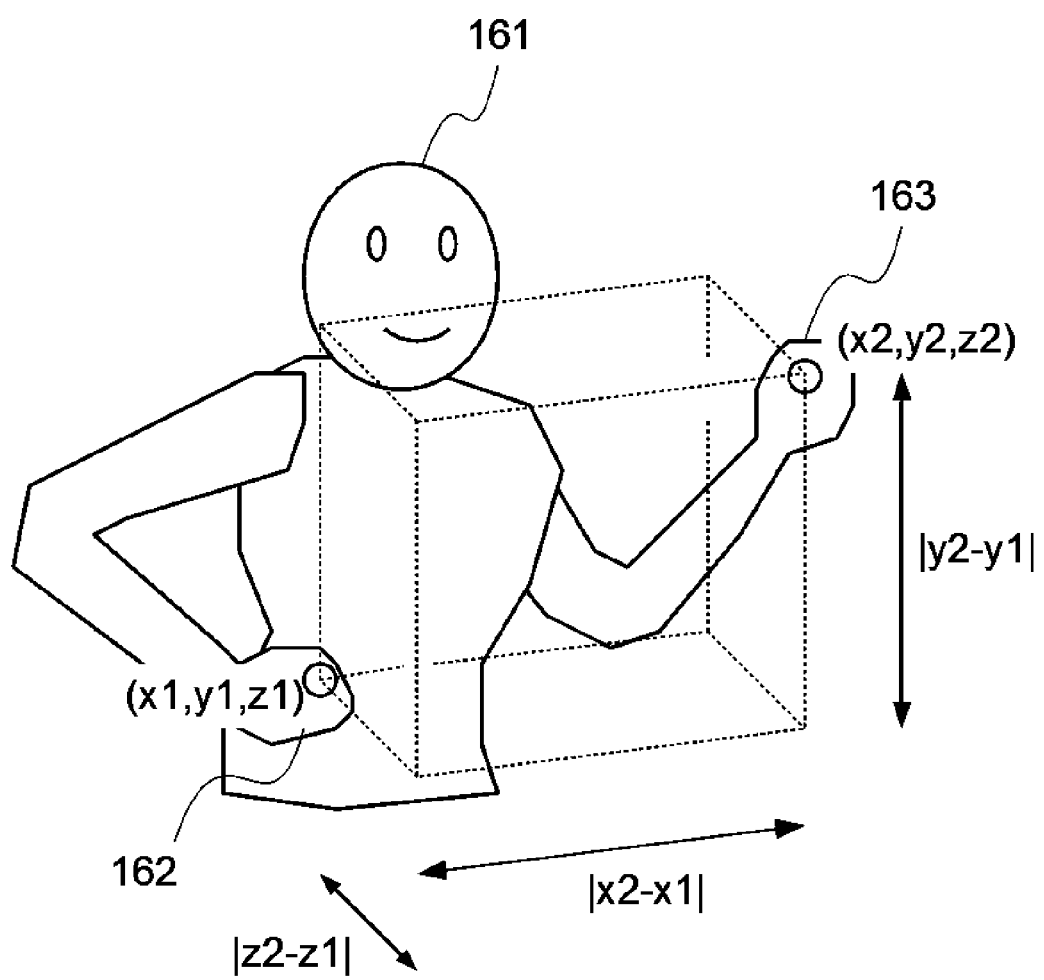
FIG. 5 is an explanatory diagram illustrating a relationship between the detected positions of both hands of a user and a specified length.

FIG. 5 is an explanatory diagram illustrating a relationship between the detected positions of both hands of the user and a specified length. An explanation below will be given with reference to this drawing.

Based on the coordinates (x1, y1, z1) of the right hand 162 of the user 161 and the coordinates (x2, y2, z2) of the left hand 163, specified lengths $|x2-x1|$, $|y2-y1|$ and $|z2-z1|$ corresponding to the width, the height, and the depth can be obtained.

In addition, according to a form of detecting the position of a joint of the user using a motion sensor, in addition to the right hand and the left hand, the waist of the user (navel, epigastrium) may be adopted as the object. This form is appropriate when three specified lengths are specified.

Figure 6:
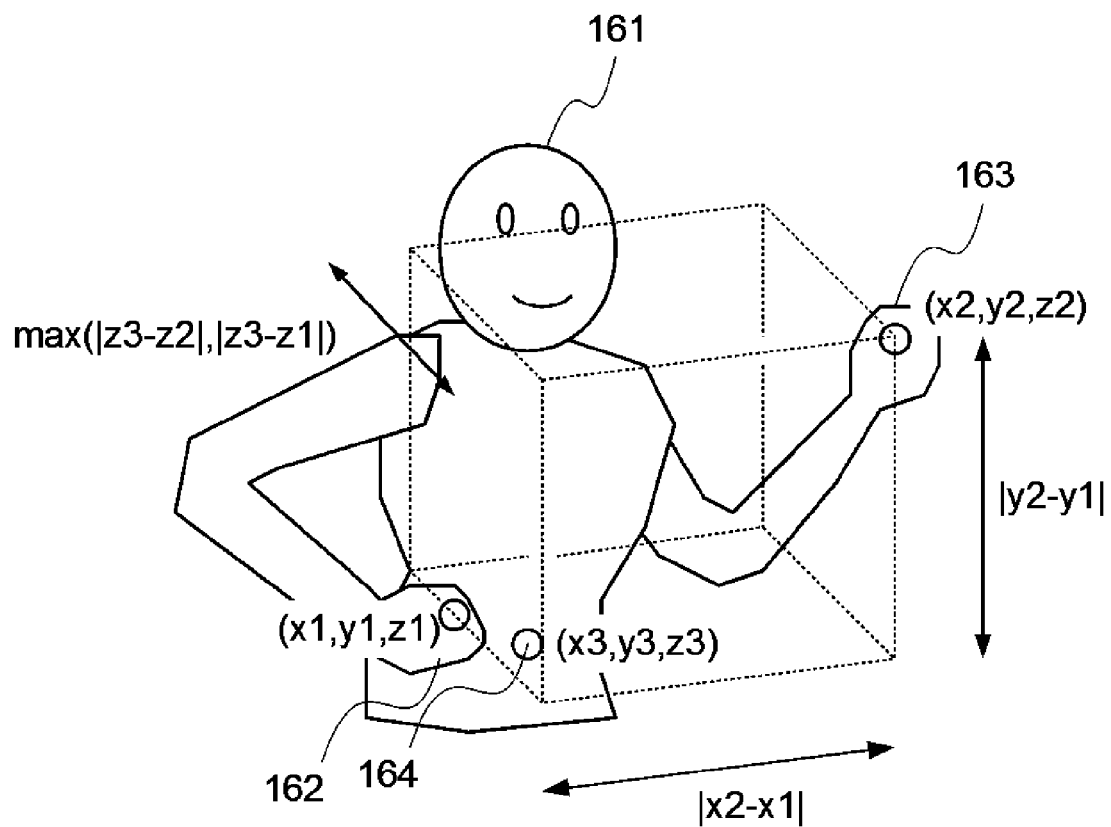
FIG. 6 is an explanatory diagram illustrating a relationship between the detected positions of both hands of the user and a waist thereof, and, a specified length.

FIG. 6 is an explanatory diagram illustrating a relationship between the detected positions of both hands of the user and the waist thereof and a specified length. An explanation will be given below with reference to this drawing.

In this drawing, like FIG. 5, the coordinates (x1, y1, z1) of the right hand 162 of the user 161, and the coordinates (x2, y2, z2) of the left hand 163 are defined, and the coordinates (x3, y3, z3) of a waist 164 of the user 161 is also illustrated.

According to this form, as the specified length corresponding to the width, $|x2-x1|$ is adopted, and as the specified length corresponding to the height, $|y2-y1|$ is adopted. That is, the width of the product and the height thereof are specified by the right and the left hand.

In addition, as the specified length corresponding to the depth, $\max(|z3-z2|, |z3-z1|)$ is adopted. This is a depth that is a distance between the navel and the hand, either the left or right hand, that is farthest from the navel.

When a large product is lifted in the user's arms, the user often supports the corners of the product with the right hand, the left hand, and the navel region. This form is to obtain a specified length in accordance with this supporting way.

In this form, instead of the position of the waist of the user, the position of the head may be utilized.

Still further, there is a form in which two users cooperatively specify three specified lengths. In this form, respective both hands of the users are adopted as four objects, and differences in depths of both hands of the respective users are compared.

Next, based on the positions of both hands of the user with a smaller difference in depth, specified lengths corresponding to the width of a product and the height thereof are obtained, and based on the positions of both hands of the user with a greater difference in depth, a specified length corresponding to the depth of the product is obtained.

Figure 7:
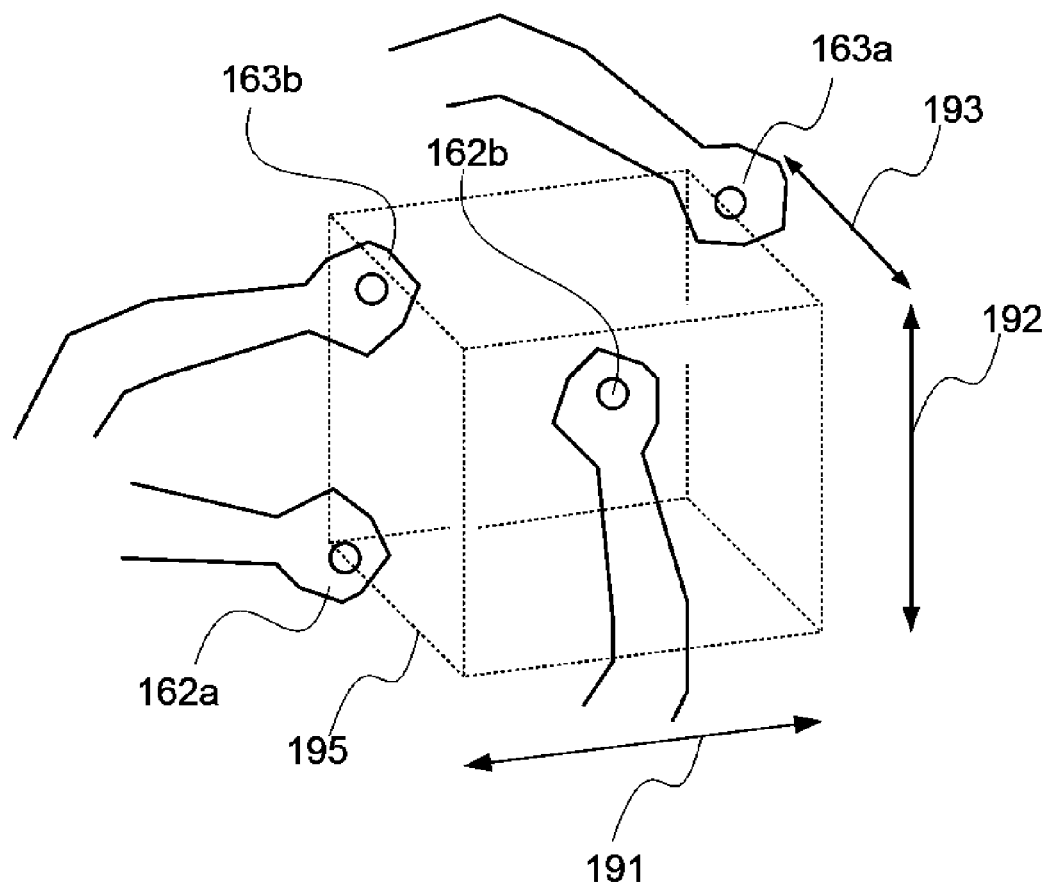
FIG. 7 is an explanatory diagram illustrating a relationship between the positions of respective both hands of two users and a specified length.

FIG. 7 is an explanatory diagram illustrating a relationship between the positions of respective hands of two users and specified lengths. An explanation will be given below with reference to this drawing.

In this drawing, both hands 162a, 163a of the first user and both hands 163b, 163b of the second user are illustrated.

According to the example illustrated in this drawing, it is expected that when a difference in depth between both hands 162a and 163a and a difference in depth between both hands 163b and 163b are compared, the difference in depth between both hands 163b and 163b is greater.

Hence, a depth length 193 can be obtained based on the difference in depth between both hands 163b, 163b of the second user.

In addition, a horizontal length 191, and a vertical length 192 are obtained based on the difference in the horizontal direction between both hands 162a and 163a of the first user and the difference in the vertical direction therebetween.

In this case, as illustrated in the drawing, a cuboid 195 is now considered which can be defined by the difference in the horizontal direction (horizontal length 191) between both hands 162a and 163a of the first user, the difference in the vertical direction (vertical length 192), and the difference in depth (depth length 193) between both hands 163b and 163b of the second user.

In this case, both hands 162a, 163a of the first user are present on two opposing sides of the cuboid 181 among four sides running in the depth direction. In addition, both hands 162b, 163b of the second user are disposed so as to hold therebetween the two faces of the cuboid 181 facing each other in the depth direction.

As explained above, upon cooperation of the two users, it becomes possible to specify a product size.

(Form of Range of Specified Length)

When the specified length is specified as explained above, it is a rare case in which the size of the product completely matches the specified length. Hence, it is preferable that a search target includes ones having a difference in some level between the specified length and the size of the product.

Therefore, it is preferable to search a product under the following various conditions based on a specified length S and a size L of the product compared with the specified length S.

Condition (1): "$|S-L| \leq E$", where E is a constant length defined beforehand. For example, about 5 cm to 20 cm can be applied as E.

Condition (2): "$|S-L|/S \leq K$", where K is a constant defined beforehand. For example, about 0.05 to 0.20 can be applied as K.

In addition, large-size television devices have a diagonal line length indicated in inches, but no product in an arbitrary inch size is sold and products with skipped values, such as 42 inch, 46 inch, 50 inch, and 60 inch, are available in the markets. In this case, a search condition is set in such a way that the closest value among the skipped values to the specified length is selected, and a product with a size matching the selected value is searched.

In addition, there is a form in which the above-explained E is not set as a constant but is specified based on an action of the user. This form will be explained later.

In order to facilitate understanding to the present invention, a specified length obtained from the distance of the objects in the horizontal direction is referred to as a horizontal length, while a range corresponding to such a horizontal length is referred to as a horizontal range. For example, according to the above-explained condition (1), the horizontal range corresponding to the horizontal length S is a range between equal to or greater than S−E and equal to or smaller than S+E.

Likewise, in the following explanations, terms like a vertical length, a vertical range, a depth length, and a depth range are used as needed.

(Display of Product Image and the Like)

Figure 8:
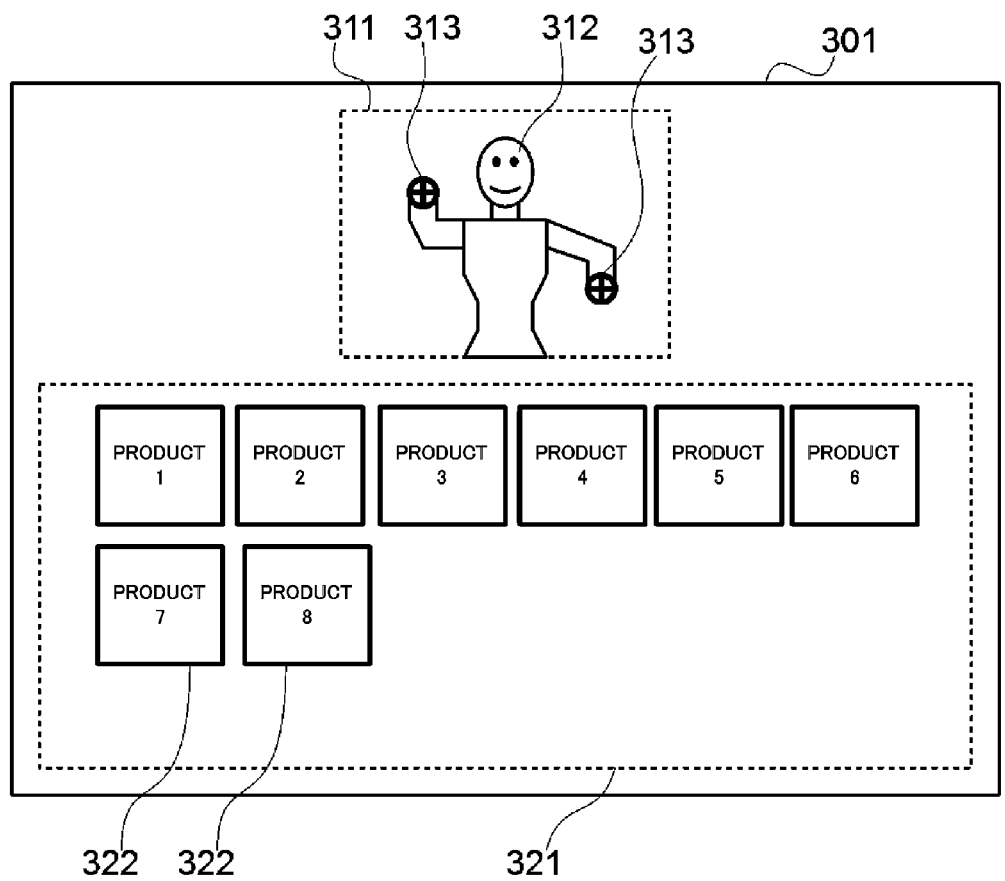
FIG. 8 is an explanatory diagram illustrating an example display of information like a product image on a screen.
Figure 9:
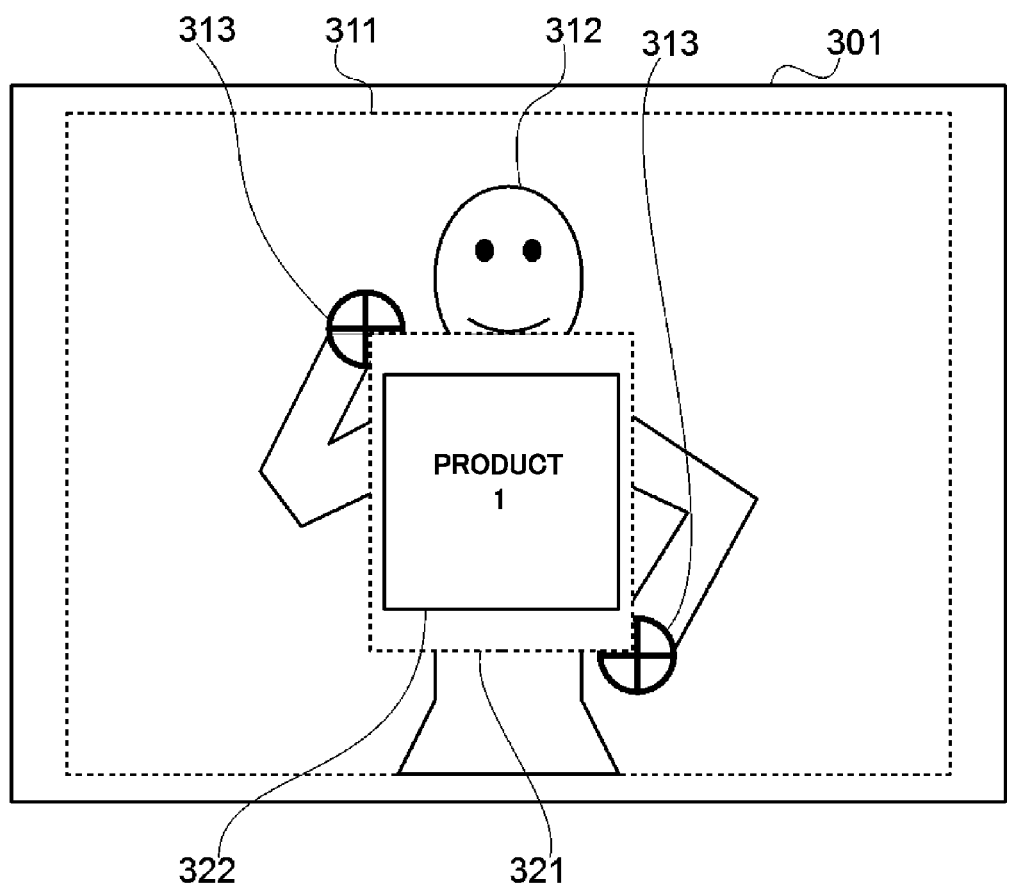
FIG. 9 is an explanatory diagram illustrating an example display of information like a product image on a screen.
Figure 10:
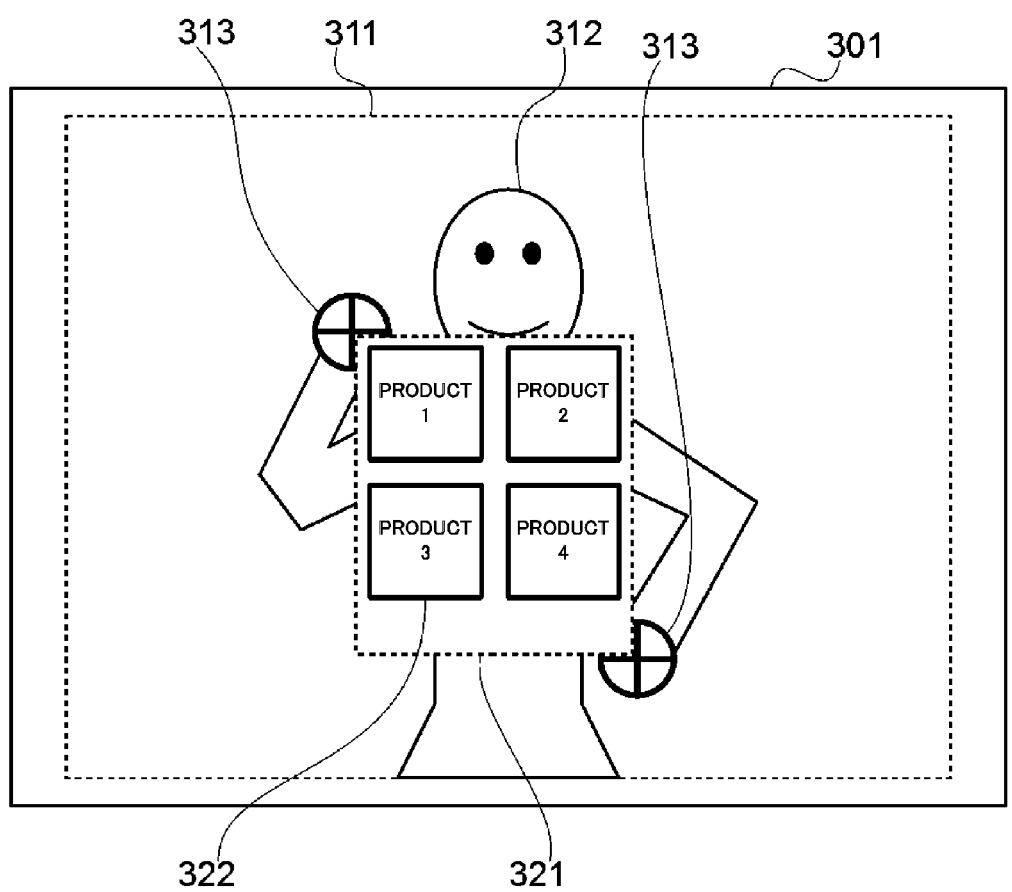
FIG. 10 is an explanatory diagram illustrating an example display of information like a product image on a screen.

As explained above, the product image set as the display target in the step S206 is displayed on the screen. FIGS. 8, 9, and 10 are explanatory diagrams illustrating an example display of information like a product image and the like on the screen. An explanation will be given below with reference to those drawings.

According to the example display illustrated in FIG. 8, a captured-image display area 311 and a product-image display area 321 are prepared in a screen 301.

In this case, a captured image containing a posture 312 of the user captured by the motion sensor is displayed on the captured-image display area 311. In addition, markings 313 depicted as a cross in a circle are displayed at positions where portions recognized as both hands in the captured image are depicted to feedback a recognition result to the user.

Conversely, the product-image display area 321 lists up and displays multiple product images 322 included in the search-result product records. Hence, the user can easily view the products with a product size specified by the user.

In the example display illustrated in FIG. 9, also, the captured-image display area 311 and the product-image display area 321 are prepared in the screen 301. The product-image display area 321 is disposed in such a way that the corners of the product-image display area 321 are held between the respective centers of the markings 313. Only one product image 322 is displayed on the product-image display area 321 in an enlarged/scaled-down manner so as to fit the product-image display area 321.

According to this display form, the product image 322 is disposed in accordance with the size of the posture 312 of the user in the captured image. Hence, the user can compare the size of the product with the size of the body of the user.

Still further, when the captured image is displayed at an enlarged factor proportional to the depth distance to the user detected by the motion sensor, and the enlarged factor of the captured image is adjusted in such a way that a distance between the head of the user and the navel (waist) thereof becomes a predetermined size in the screen 301 upon recognition of the joints of the user, the posture 312 of the user can have a substantially constant size displayed in the captured image regardless of the distance between the user and the motion sensor. Application of such a technology enables the user to intuitively figure out the specified length and the product size.

According to the example display illustrated in FIG. 10, like the case in FIG. 9, the product-image display area 321 is disposed in such a way that the corners thereof are held between the respective centers of the markings 313.

In addition, like the case in FIG. 8, the product images 322 are listed up and displayed in the product-image display area 321.

According to this form, the user can simultaneously view the product size relative to the body of the user and the list of products matching the product size through the screen 301.

Various ways of displaying the product images are possible, and thus the details thereof will be explained later.

A further detailed explanation will be below given of various embodiments of the search device 101. In the following explanation, in order to facilitate understanding, a further detailed structure from this embodiment and a difference from this embodiment will be mainly explained, and the explanation for the common matters with this embodiment will be omitted accordingly.

Second Embodiment

This embodiment is appropriate when right and left hands of the user are adopted as the objects.

In general, when a human expresses a length using the body, in order to specify a width, such a human often spreads both hands horizontally, and in order to specify a height, such a human often spreads both hands vertically, but the human sometimes expresses a diagonal line between the height and the width.

Conversely, there are various kinds of products which have a substantially constant aspect ratio but have a product variation mainly depending on a height, or have a product variation mainly depending on a width, and the like.

In this embodiment, it is automatically determined whether the hands of the user indicates the width of a product or not only the width but also a height in accordance with the genre of the product.

In this embodiment, both hands of the user are objects, and thus the number of objects is two.

In addition, according to the simplest form of this embodiment, no depth of both hands is taken into consideration. In this case, the positions of both hands in the depth direction detected through the motion sensor are ignorable, but the positions in the horizontal direction and in the vertical direction are taken into consideration.

In this case, the calculator 103 of this embodiment calculates, like the above-explained embodiment, a horizontal length and a horizontal range based on the distance between both hands of the user in the horizontal direction, and calculates a vertical length and a vertical range based on the distance in the vertical direction.

Next, the searcher 104 performs searching under the following two conditions:

(1) Product records with a product width within the horizontal range. The number of product records satisfying this condition is Nw.

(2) Product records with a product width within the horizontal range and with a product height within the vertical range. The number of product records satisfying this condition is Nwh.

According to this embodiment, it is estimated that the user desires a searching based on a product width when Nwh is quite smaller than Nw. A search result under the condition (1) is adopted, and a product image is presented to the user.

Conversely, when it is not true that Nwh is quite smaller than Nw, it is estimated that the user desires a searching based on both product width and product height. A search result under the condition (2) is adopted, and a product image is presented to the user.

As a condition (hereinafter, referred to as a "small-number condition") representing that "x is quite smaller than y", $x=0$ and $y \geq 1$ can be adopted as the simplest condition. This corresponds to, according to the above-explained example case, a case in which there is no product satisfying both horizontal range and vertical range but there are products satisfying the horizontal range.

In addition, this condition can be generalized more, and when, with respect to a predetermined positive threshold M, $x < M$ and $y \geq M$, is satisfied, it can be determined that the small-number condition is satisfied, and when $x \times M \leq y$, it can be determined that the small-number condition is satisfied.

According to the above-explained example, there is a presumption that when the user specifies a length using both right and left hands, such a specified length often represents a width, but this presumption can be generalized more. That is, three kinds of:

(1) Product records (number: Nw) with a product width within the horizontal range;

(2) Product records (number: Nwh) with a product width within the horizontal range and with a product height within the vertical range; and (3) Product records (number: Nh) with a product height within the vertical range, are searched, and based on the large/small relationship among Nw, Nh, and Nwh, it is possible to estimate what the desire of the user is.

When Nwh is quite smaller than Nw, or when Nwh is quite smaller than Nh, the user possibly does not specify both width and height. Hence, in this case, when Nw>Nh, a search result under the condition (1) is adopted, and when Nw≤Nh, a search result under the condition (3) is adopted.

When Nwh is not quite smaller than Nw, and Nwh is not quite smaller than Nh, a search result under the condition (2) is adopted.

When the number of search results under the condition (1) and the condition (3) are too large, in order to present more effective search result to the user, a search result under the condition (2) may be adopted.

In addition, there is a scheme of, setting a longer one of the horizontal length and the vertical length to be a first length, and a shorter one to be a second length, setting a first range and a second range corresponding to the first length and the second length, respectively, and searching product records for the first range.

According to this scheme, when the number of product records searched based on the first range is too great (it can be determined based on whether or not to exceed a predetermined threshold, or may be determined through a determination with the inversed small-number condition), product records satisfying both first range and second range are taken as search results.

Still further, when the number of product records searched based on the first range is not too great, the product records searched based on the first range are taken as the search result.

According to this scheme, an appropriate number of product records are presented to the user, thereby presenting information in an easy-to-understand manner to the user.

The first length and the second length may be set in accordance with not the long/short relationship between the horizontal length and the vertical length but a product genre. In the case of, for example, a skirt, the vertical length is set as the first length.

According to this embodiment, in order to facilitate the user to check which search condition is adopted, it is desirable to display such a notification to that effect on the screen 301.

Figure 11:
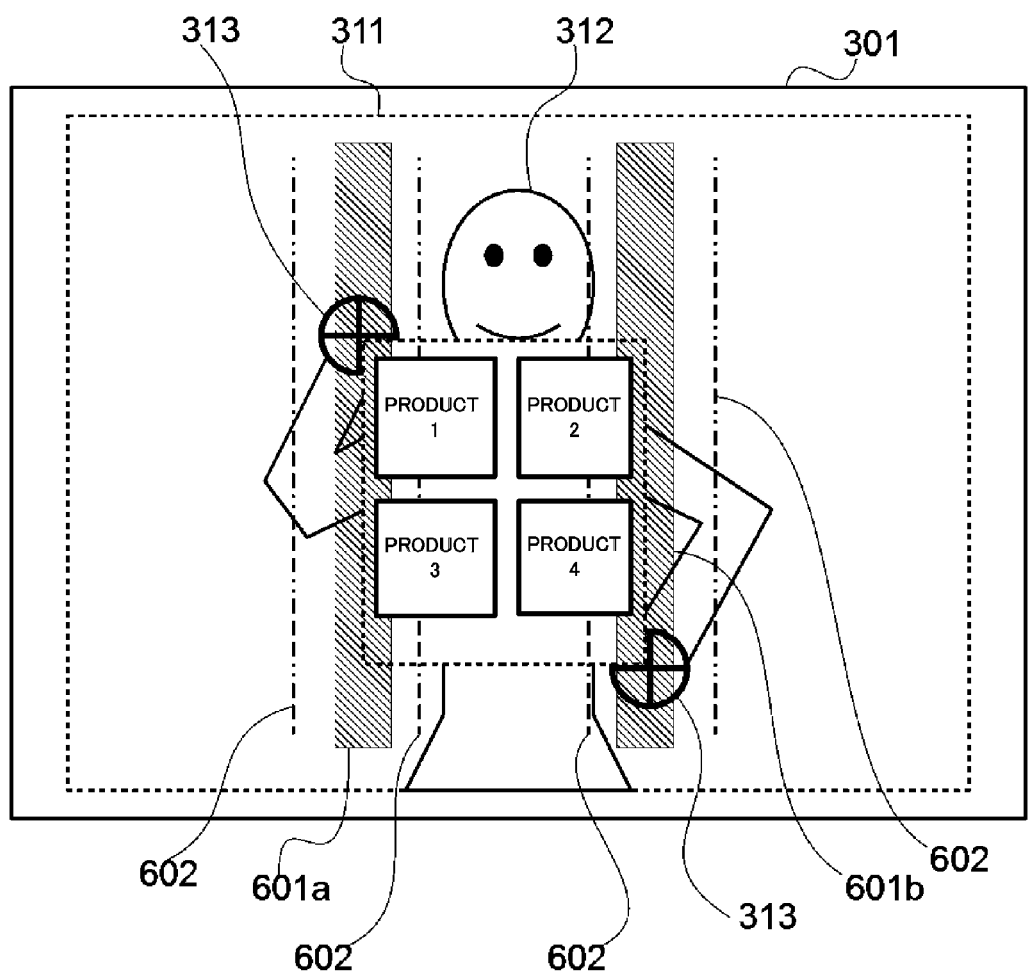
FIG. 11 illustrates an example display of an indicator to the effect that a product will be searched based on a horizontal range on a screen.

FIG. 11 is an example display of displaying a notification to the effect that a product is searched based on the horizontal range on the screen 301.

As illustrated in this drawing, two stripes 601a and 601b representing a horizontal range are displayed in the screen 301 in the vertical direction from the markings 313. This is to let the user to know that a product with a produce size such that the left end of a product is within the stripe 601a, and the right end of the product is within the stripe 601b relative to the size of the body of the posture 312 of the user expressed in the captured image was searched.

Figure 12:
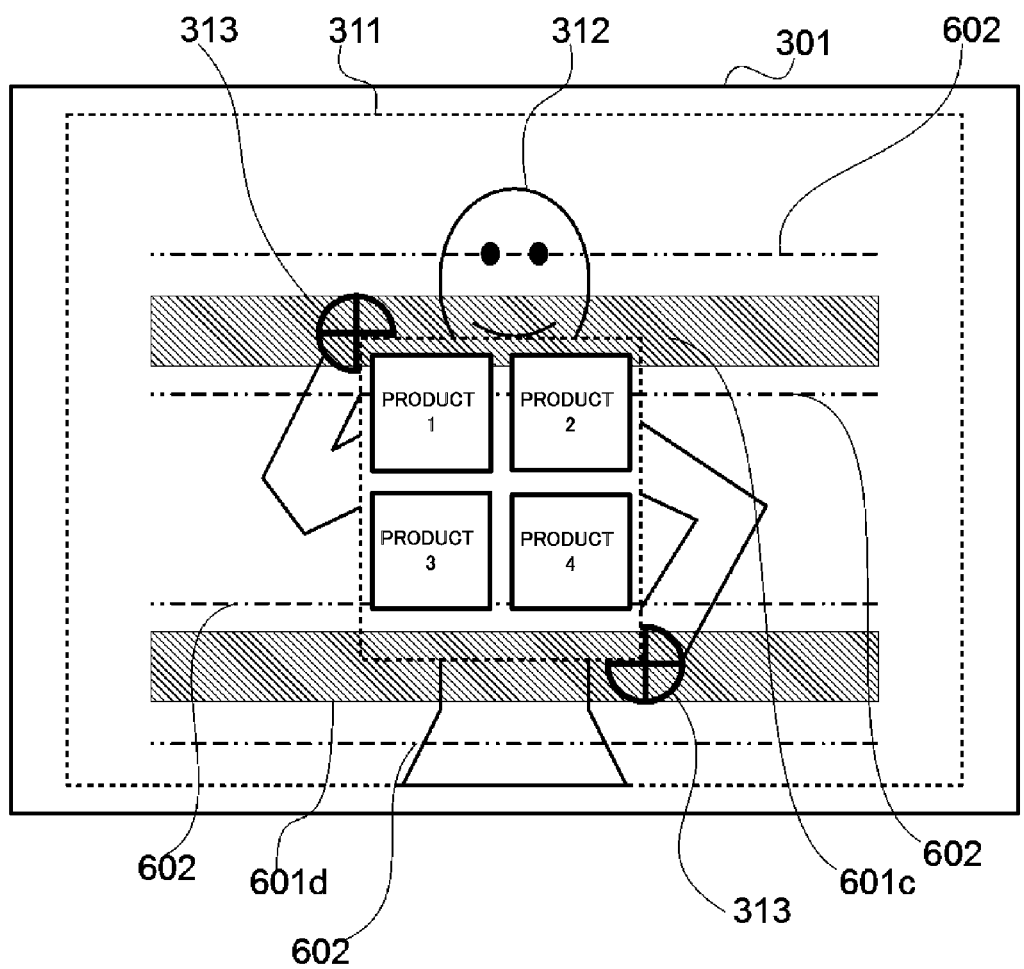
FIG. 12 illustrates an example display of an indicator to the effect that a product will be searched based on a vertical range on a screen.

FIG. 12 is an example display of displaying a notification to the effect that a product is searched based on a vertical range on the screen 301.

As illustrated in this drawing, two stripes 601c and 601d representing a vertical range are displayed in the screen 301 in the horizontal direction from the markings 313. This is to let the user to know that a product with a product size such that the upper end of the product is within the stripe 601c and the bottom end of the product is within the stripe 601d relative to the size of the body of the posture 312 of the user expressed in the captured image was searched.

Figure 13:
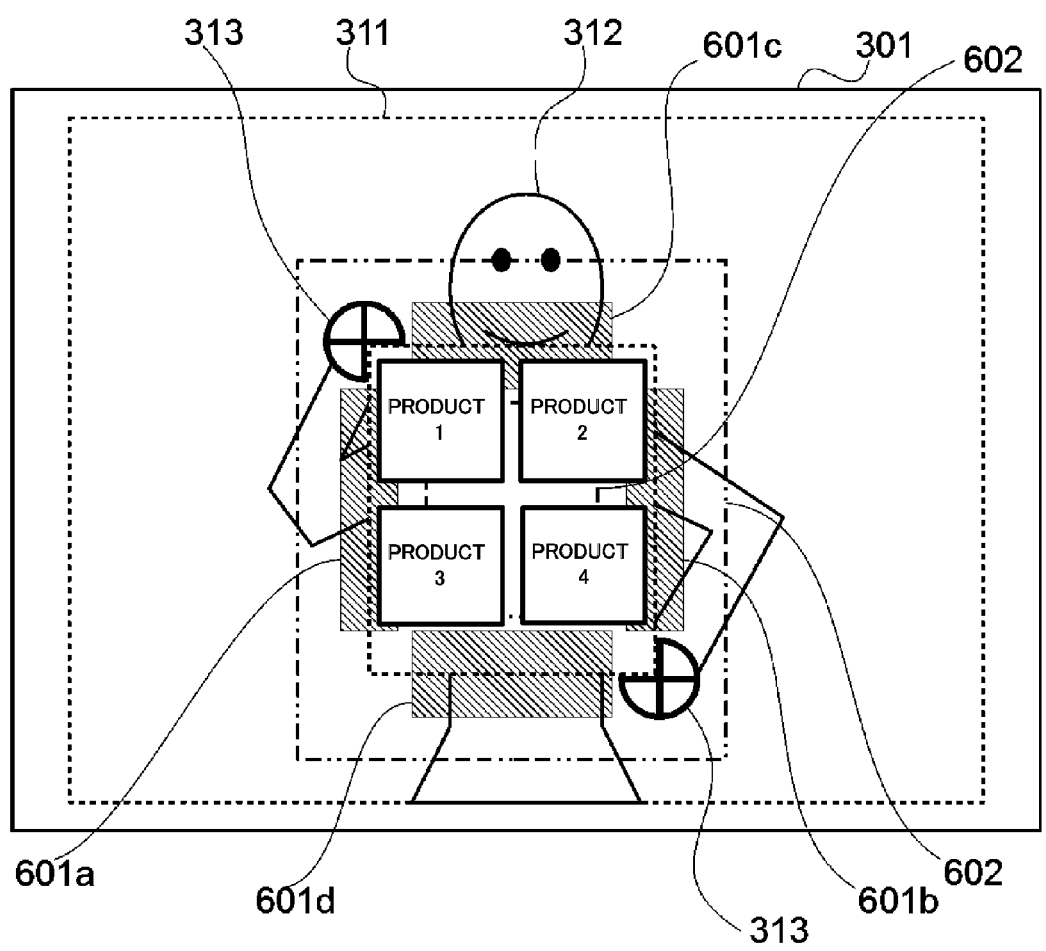
FIG. 13 illustrates an example display of an indicator to the effect that a product will be searched based on a horizontal range and a vertical range.

FIG. 13 is an example display of displaying a notification to the effect that a product is searched based on the horizontal range and the vertical range on the screen 301.

As illustrated in this drawing, the two stripes 601a and 601b indicating a horizontal range are displayed in the screen 301 from the markings 313. The two stripes 601c and 601d indicating a vertical range are also displayed. This is to let the user to know that a product with a product size such that the left end of the product is within the stripe 601a, the right end of the product is within the stripe 601b, the upper end of the product is within the stripe 601c, and the bottom end of the product is within the stripe 601d relative to the size of the body of the posture 312 of the user expressed in the captured image was searched.

The widths of the stripes 601a, 601b, 601c, and 601b are set relative to the size of the body of the posture 312 of the user expressed in the captured image, and are linked with the lengths of the horizontal range and the vertical range. Hence, when such a notification scheme is applied to the above-explained embodiment or the following embodiments, it becomes possible to let the user to know the range of the product size searched.

In addition, in the cases of FIGS. 11, 12, and 13, a border line 602 indicating the upper limit and lower limit of the product size registered in the product database is displayed in parallel with the stripes 601a, 601b, 601c, and 601b. When the user views the border line 602, the user can intuitively understand what product sizes are available.

Third Embodiment

According to the example displays illustrated in FIGS. 8 and 10, the product image 322 is provided with a so-called icon with a preset size, but when the product images 322 are listed up and displayed, such an icon can be enlarged/scaled-down in accordance with a specified length.

Figure 14:
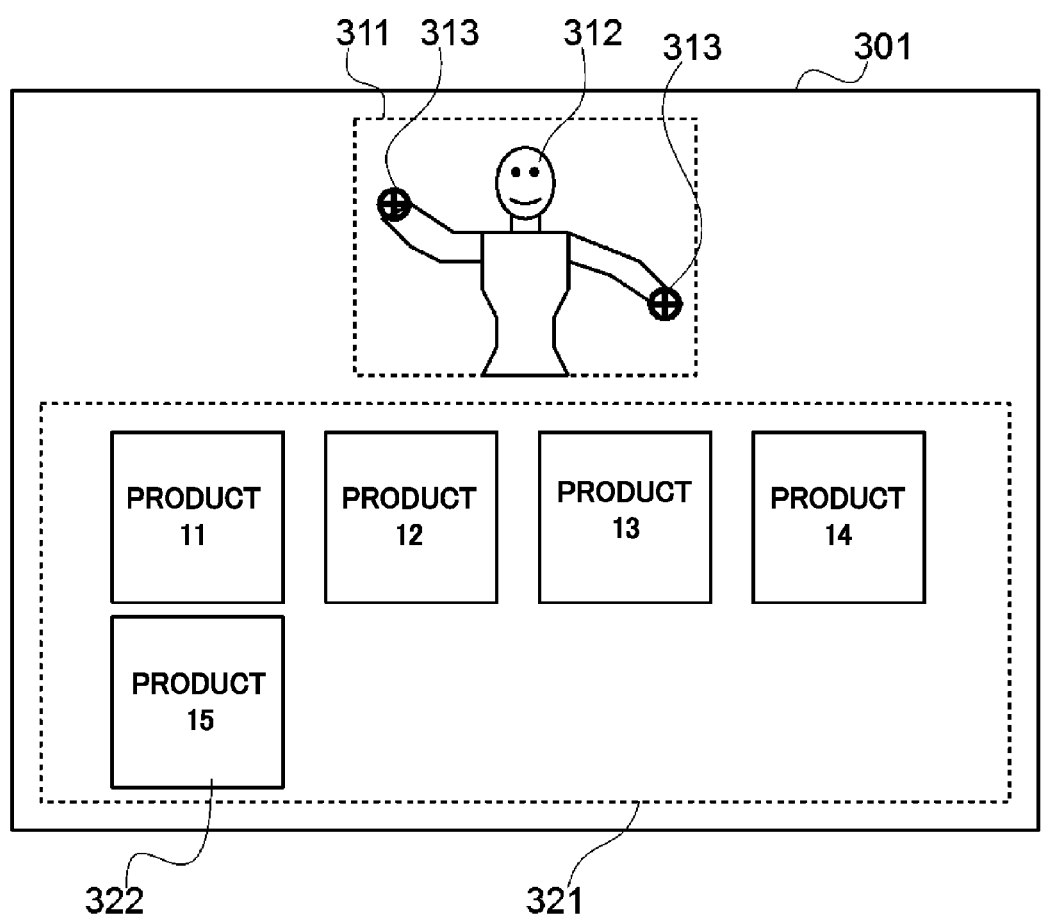
FIG. 14 is an exemplary diagram illustrating an example display that changes the size of a product image in accordance with a specified length.

FIG. 14 is an explanatory diagram illustrating an example display of changing the size of a product image in accordance with a specified length. An explanation will be given below with reference to this drawing.

According to the example case illustrated in FIG. 14, in comparison with the example case illustrated in FIG. 8, a distance between the markings 313 is widespread. Hence, the specified length is elongated. Accordingly, the products displayed as the search results are different.

In addition, as is clear when this drawing is compared with FIG. 8, the longer the specified length is, the larger the size of the product image 322 displayed in the screen 301 becomes. Hence, the user can intuitively perceive a change in the specified length.

The enlargement/scale-down ratio of the product image 322 can be set so as to be proportional to a specified length or can be set so as to become large step by step.

In addition, according to the example display illustrated in FIG. 9, one product image 322 with a size relative to the body of the user is displayed. Hence, the user can intuitively perceive a specified length relative to the body of the user.

According to the example case illustrated in FIG. 9, when there are the multiple search results that are the product records, the product images 322 may be sequentially changed for a certain cycle, or one product record of a representative product like the most recent popular product may be selected among the search results, and the product image 322 of such a product may be displayed.

According to this embodiment, the user can intuitively understand a change in the specified length that the user is specifying based on a change in the size of the product image 322 displayed in the screen.

Fourth Embodiment

In the above-explained embodiments, the horizontal range and the like is set based on the preset constant E and constant K, but those can be set in accordance with a motion of the object.

In order to facilitate understanding, a horizontal length between right and left hands of the user calculated based on a result detected at a time u will be denoted as S(u), and a predetermined positive time length will be denoted as D.

In this embodiment, a horizontal range R(t) at a time t is set as:

$$R(t) = \min_{t-D \leq u \leq t} S(u) \text{ to } \max_{t-D \leq u \leq t} S(u)$$

This is to set a range between the minimum value and maximum value of the distance in the horizontal direction between both hands at a latest time zone t−D to t of the time t to be the horizontal range R(t).

Alternatively, in order to set a margin to some level in the horizontal range, the horizontal range may be set as follow:

$$R(t) = \min_{t-D \leq u \leq t} S(u) - E \text{ to } \max_{t-D \leq u \leq t} S(u) + E$$

While the user is moving both hands a great deal, the horizontal range becomes large, and according to the form of displaying the stripes 601a and 601b in the screen, the width thereof becomes also wide. Conversely, when the user fixes the posture, the horizontal range becomes narrow, and when the time D elapses while the user maintains the still posture, the horizontal range becomes the minimum width.

Figure 15:
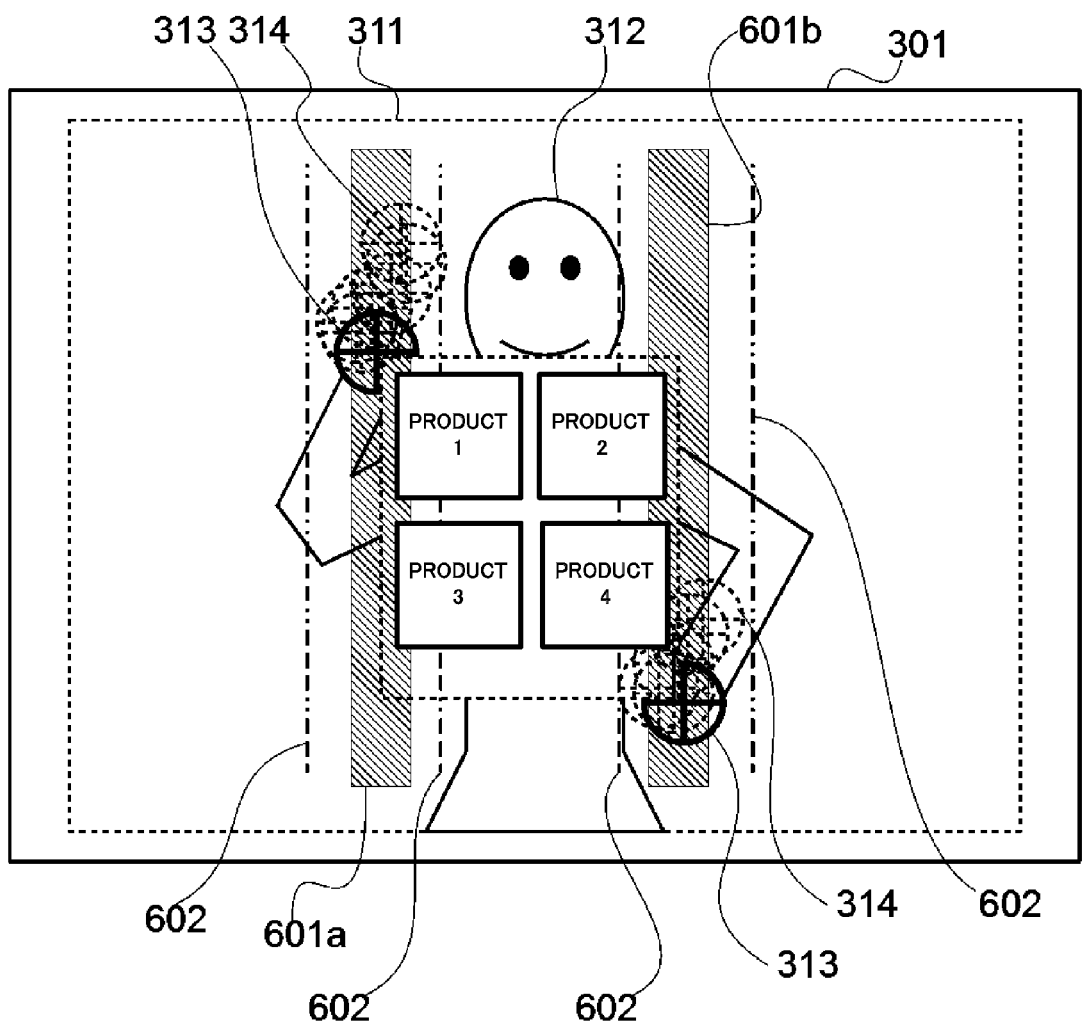
FIG. 15 illustrates an example display of displaying a motion of a user on a screen in an easy-to-understand manner.

FIG. 15 is an example display of displaying the motion of the user in the screen in an easy-to-understand manner in the example display illustrated in FIG. 11.

According to this example case illustrated in this drawing, when the marking 313 moves in the screen 301, an image lag 314 (indicated by dotted lines in this drawing) is displayed so as to appear only for a certain time (for example, the time D). Hence, the image lag 314 is visible within the stripes 601a and 602b.

By employing a display scheme of such marking 313 and image lag 314, it becomes possible to let the user to intuitively know that the range where the user moves the hands corresponds to the horizontal range and the like subjected to a searching.

In this example case, the horizontal range is explained as an example, but the same is true of the vertical range.

In addition, when the search result changes, the product image 322 to be displayed in the screen 301 also changes, but with respect to this product image 322, an image lag may be displayed like the marking 313 for a certain time. The display of the image lag of the product image 322 enables the user to intuitively understand an increase/decrease of the search result.

Fifth Embodiment

In the above-explained embodiments, a distance between both hands of the user in the horizontal direction is directly adopted as the horizontal length, but a result having a detected distance converted into a predetermined precision, such as 5 cm by 5 cm, 10 cm by 10 cm, 1 inch by 1 inch, may be adopted as a specified length.

According to this form, even if the positions of both hands of the user are slightly displaced, the search condition generated in the step S204 often becomes the same as the search condition previously generated.

In addition, when the specified range is set based on the specified length, such a setting can be made based on such a precision. A specified range from a length one indent smaller than the specified length to the specified length (from a one-size smaller value to a specified size) can be set, a range from the specified length to a length one indent longer than the specified length (from the specified size to a one-size greater value) can be set as the specified range, or a range from a length one indent smaller than the specified length to a length one indent longer than the specified length (from a one-size smaller value to a one-size greater value) can be set as the specified range.

Figure 16:
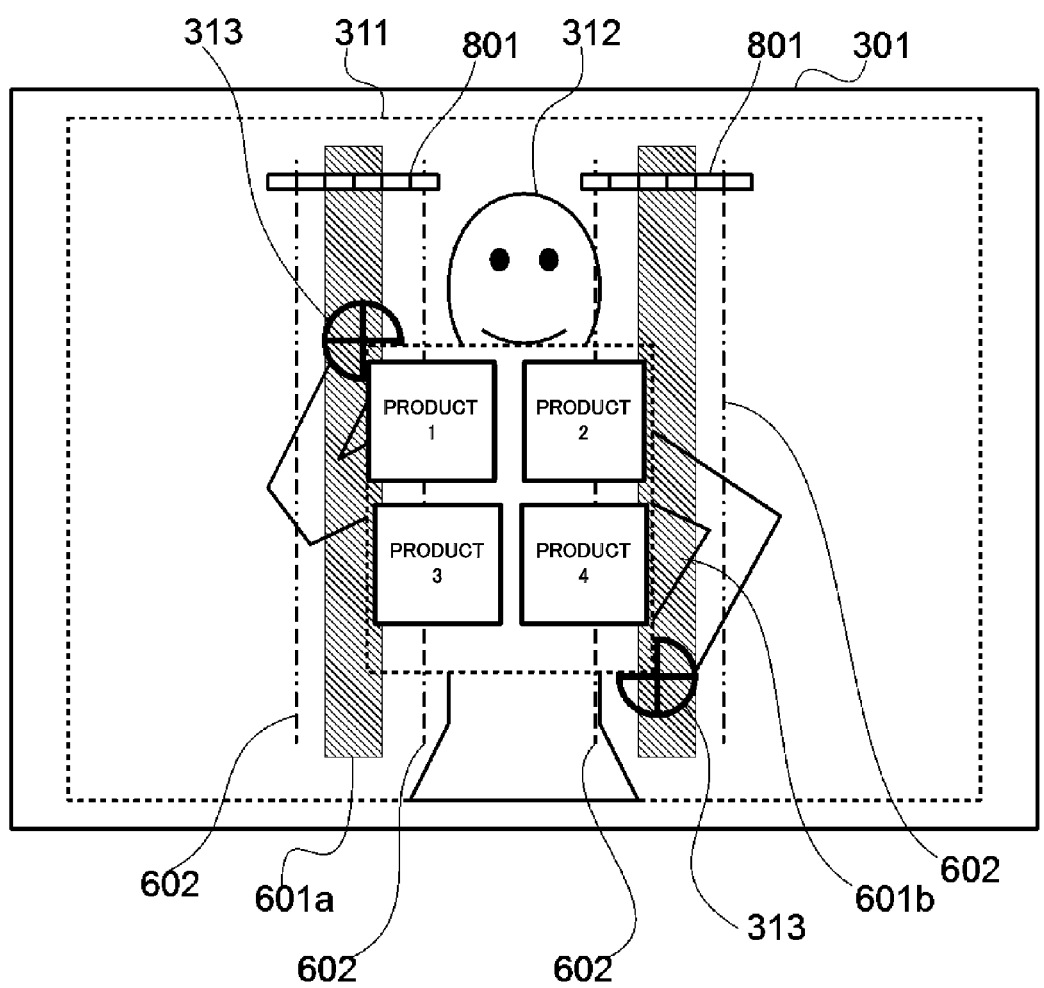
FIG. 16 is an exemplary diagram illustrating an example display of displaying the precision of a specified length on a screen.

FIG. 16 is an explanatory diagram illustrating an example display of displaying the precision of a specified length in the screen. An explanation will be given below with reference to this drawing.

This drawing illustrates indicators 801 indicating the precision of a specified length, that is, an indent range in the example display illustrated in FIG. 11.

A scale indicated in the indicator 801 represents a range of a size, and in this drawing, a size covering a specified length specified by the user, and a one-size-over size are set as a specified range. Hence, the widths of the stripes 601a and 601b correspond to two scales in the indicator 801.

As explained above, according to this embodiment, upon viewing the relationship between the indicator 801 and the stripe 601, it becomes easy for the user to perceive what size of indent the product size can be divided, and in which range a current searching is performed.

In addition, the indicator 801 illustrated in this drawing also has a role of guiding the user that a specified length to be specified for the product currently subjected to a search (may be all products registered in the product database or may be only products in a genre specified by the user in advance), that is, a specified length applied to a search condition is a horizontal length.

Like the example case illustrated in this drawing, when a specified length to be specified is a vertical length, if an indicator running in the vertical direction is displayed in the screen, this can serve as a guide to the user.

Still further, according to this embodiment, the frequency of performing a searching again (step S205) of the product records and a re-setting (step S206) of the product image that is a display target can be reduced, and thus a calculation load can be reduced.

Sixth Embodiment

According to this embodiment, every time the product records are searched again, information indicating the increase/decrease in the number of searched product records is displayed in the screen 301.

When, for example, the number of searched product records increases, the marking 313, the stripe 601, the background of the product-image display area 321, and the like are indicated by a red color, and when such a number decreases, those are indicated by a blue color. The intensity of the red color and the blue color may be set in accordance with the level of the increase/decrease.

Figure 17:
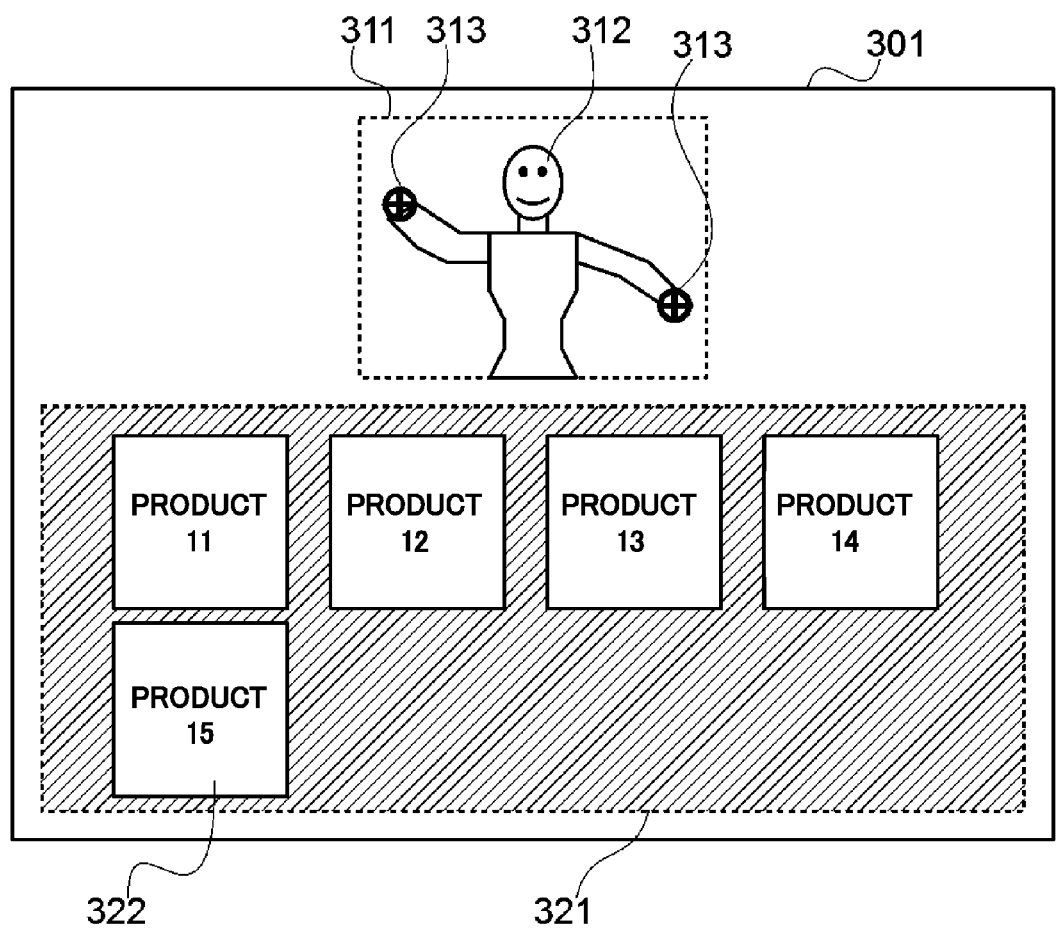
FIG. 17 is an exemplary diagram illustrating an example display when the number of product records changes since a user changes a posture.
Figure 18:
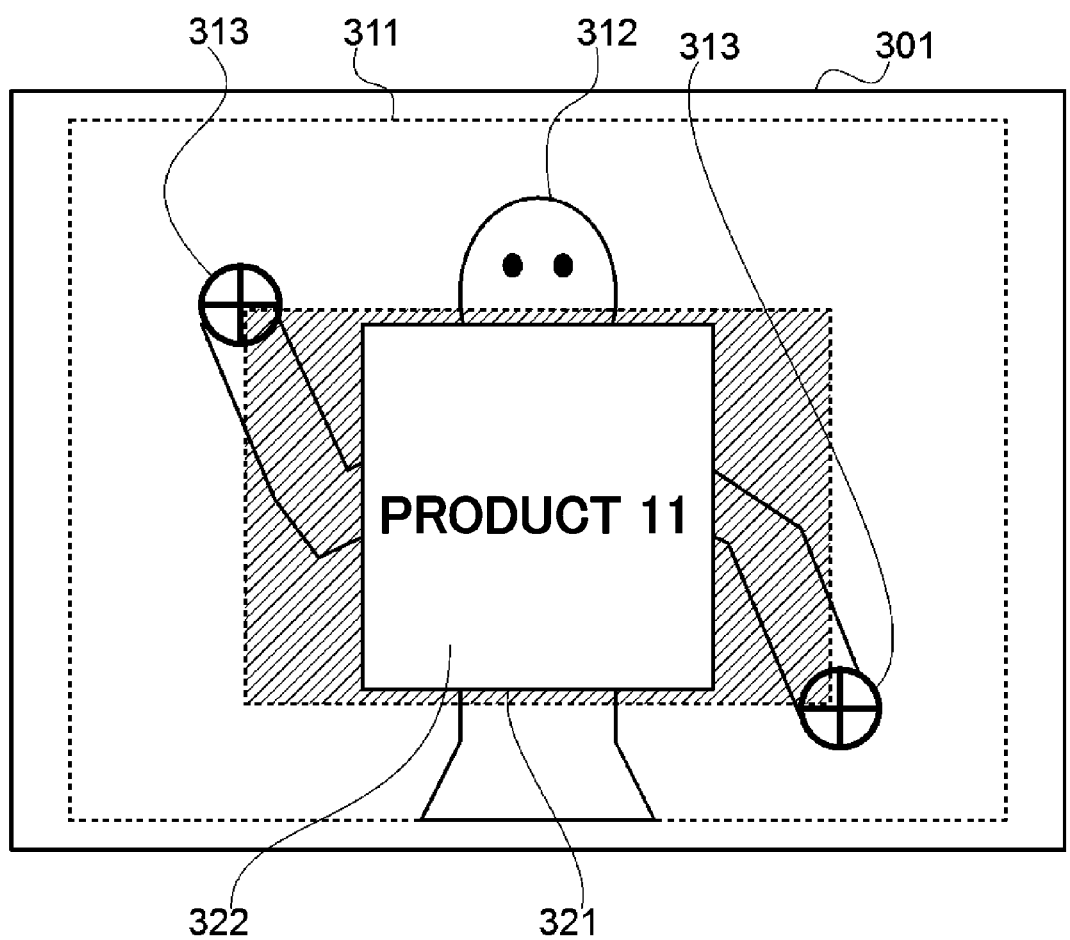
FIG. 18 is an exemplary diagram illustrating an example display when the number of product records changes since the user changes the posture.

FIGS. 17 and 18 are explanatory diagrams illustrating example displays when the number of product records changes since the user changes the posture after the example displays illustrated in FIGS. 8 and 9. An explanation will be below given with reference to those drawings.

According to the example displays illustrated in those drawings, the brightness of the semi-transparent background of the product-image display area 321 is changed, thereby expressing the increase/decrease in the number of product records that are search results. That is, when the search results increase, the brightness becomes brighter, and when the search results decrease, the brightness becomes darker.

In comparison with the background of the product-image display area 321 in the example displays illustrated in FIGS. 8 and 9, the background of the product-image display area 321 in the example displays illustrated in FIGS. 17 and 18 is expressed with a darker color (in those drawings, expressed by hatched lines).

According to this embodiment, it becomes possible for the user to intuitively understand how many the search results are present, and this embodiment is appropriate when, in particular, as illustrated in FIGS. 9 and 18, only one product image 322 is displayed in the product-image display area 321.

Seventh Embodiment

According to the above-explained embodiments, the product records are searched based on a relationship among a product size, a specified length, and a specified range.

In this embodiment, the products are further refined based on information captured in a captured image.

That is, a gender of the user and an age-group thereof are estimated based on the face of the user and the appearance of the clothing captured in the captured image. Next, in addition to a refinement based on the product size, the products are further refined based on product purchase histories of the whole users matching the estimated gender and age-group.

According to the above-explained embodiments, in order to let the user to intuitively specify a specified length, the image of the user is captured, but according to this embodiment, the imaging result is utilized for a further refinement of the products. Hence, information is utilized further effectively, enabling a presentation of the search results to the user in accordance with the tendency thereof.

The applicant claims the benefit of priority based on Japanese Patent Application No. 2011-217443 filed on Sep. 30, 2011 for the present application, and the whole disclosure of this counterpart application is herein incorporated in this specification by reference as far as the practice in the designated country permits.

INDUSTRIAL APPLICABILITY

According to the present invention, it becomes possible to provide a search device, a search method, a recording medium, and a program which obtain a specified length to be specified for a search query based on the position of an object having such a position set in accordance with a user's intent like the hand of the user.

REFERENCE SIGNS LIST

101 Search device
102 Detector
103 Calculator
104 Searcher
105 Display

151 Computer
152 Motion sensor
153 Display
161 User
162 Right hand
163 Right hand
171 Depth distance
172 Angle
191 Horizontal length
192 Vertical length
193 Depth length
195 Cuboid
301 Screen
311 Captured-image display area
312 Captured posture of user
313 Marking
314 Image lag
321 Product-image display area
322 Product image
601 Stripe
602 Border line
801 Indicator

The invention claimed is:

1. A search device comprising:
a detector configured to detect respective positions of a plurality of objects in a real space, the respective positions being positioned based on an intent of a user;
a calculation unit implemented by at least one processor, configured to calculate a specified length based on the detected positions of the plurality of objects;
a search unit, implemented by the at least one processor, configured to search for a product record with a product size satisfying a search condition based on the calculated specified length from a product database managing a product record containing at least the product size and a product image; and
a display configured to display on a screen the product image of the searched product record, wherein:
a number of the plurality of objects is two;
the detector detects, as the respective positions of the plurality of objects, positions in a first direction and positions in a second direction;
the calculation unit calculates, as the specified length on the basis of the intent of the user, a first length representing a distance between the two objects in the first direction, and a second length representing a distance between the two objects in the second direction based on the detected positions of the two objects; and
the search unit searches for a product record with a product size including a first product length and a second product length, the first product length and the second product length satisfying a search condition based on the calculated first length and the calculated second length.

2. The search device according to claim 1, wherein:
the detector detects, as the respective positions of the plurality of objects, positions in a horizontal direction;
the calculation unit calculates, as the specified length on the basis of the intent of the user, a horizontal length representing a distance between the plurality of objects in the horizontal direction;
the product size includes a product width; and
the search unit sets a horizontal range covering the horizontal length, and searches for the product record having the product width within the horizontal range.

3. The search device according to claim 1, wherein:
the detector detects, as the respective positions of the plurality of objects, positions in a vertical direction;
the calculation unit calculates, as the specified length on the basis of the intent of the user, a vertical length representing a distance between the plurality of objects in the vertical direction;
the product size includes a product height; and
the search unit sets a vertical range covering the vertical length, and searches for the product record having the product height within the vertical range.

4. The search device according to claim 1, wherein:
the detector detects, as the respective positions of the plurality of objects, positions in a horizontal direction, positions in a vertical direction, and positions in a depth direction;
the calculation unit calculates, as the specified length on the basis of the intent of the user, a horizontal length representing a distance between the plurality of objects in the horizontal direction, a vertical length representing a distance between the plurality of objects in the vertical direction, and a depth length representing a distance between the plurality of objects in the depth direction;
the product size includes a product width, a product height, and a product depth; and
the search unit sets a horizontal range covering the horizontal length, a vertical range covering the vertical length, and a depth range covering the depth length, and, searches for the product record having the product width within the horizontal range, the product height within the vertical range, and the product depth within the depth range.

5. The search device according to claim 1, wherein the display displays on the screen a captured image capturing the user in the real space and displays the product image in an enlarged/scaled-down manner at an enlargement/scale-down ratio in which a relative size of the product image to a size of a body of the user in the screen is a relative size of the specified length to the size of a body of the user in the real space.

6. The search device according to claim 1, wherein:
the plurality of objects are both hands of the user; and
the display displays a captured image capturing the real space in the screen, estimates positions where both hands of the user are captured in the captured image displayed in the screen based on the detected positions, and causes the product image contained in the searched product record to be fit so as to be held between the estimated positions to display the product image.

7. The search device according to claim 6, wherein:
the detector detects the positions of the plurality of objects based on the captured image; and
the search unit estimates an attribute of the user based on a posture of the user captured in the captured image, and performs search refinement on the product records based on product purchase histories of users having the estimated attribute.

8. The search device according to claim 1, wherein:
the plurality of objects are both hands of the user; and
the display displays a captured image capturing the real space in the screen, estimates positions where both hands of the user are captured in the captured image displayed in the screen based on the detected positions, and displays markings at the estimated positions.

9. The search device according to claim 8, wherein when the estimated position changes, the display displays an image lag of the marking for a predetermined time at the position prior to the change.

10. The search device according to claim 8, wherein:
the detector detects a depth position of the user; and
the display causes the captured image to be enlarged/scaled-down at an enlargement/scale-down ratio in accordance with the depth position of the user, and displays the enlarged/scaled-down image in the screen.

11. The search device according to claim 1, wherein:
the plurality of objects are respective both hands of two users;
distances in a horizontal direction between respective both hands of the two users, distances in a vertical direction, and distances in a depth direction are obtained based on detected positions of respective both hands of the two users in the horizontal direction, the vertical direction, and the depth direction;
in the obtained distances in the depth direction, the distance in the horizontal direction obtained using the both hands based on a smaller distance in the depth direction is calculated as a horizontal length;
in the obtained distances in the depth direction, the distance in the vertical direction obtained using the both hands based on the smaller distance in the depth direction is calculated as a vertical length;
a greater distance in the obtained distances in the depth direction is calculated as a depth length;
the product size includes a product width, a product height and a product depth;
the search unit sets a horizontal range covering the horizontal length, sets a vertical range covering the vertical length, and sets a depth range covering the depth length; and
the search unit searches for the product record having the product width within the horizontal range, the product height within the vertical range, and the product depth within the depth range.

12. The search device according to claim 1, wherein:
the search unit sets a specified range covering the specified length, and searches the product record having the product size within the specified range from the product database; and
the display further displays the specified range in the screen.

13. The search device according to claim 1, wherein the search unit sets a specified range covering the specified length based on a size of an area where the position detected by the detector has moved within a latest predetermined time, and searches for the product record having the product size within the specified range.

14. The search device according to claim 1, wherein the display displays, for a predetermined time, an image lag of the product image of the product record excluded from a search result when the search unit starts over searching.

15. The search device according to claim 1, wherein:
the specified length is calculated in a predetermined precision; and
the search unit searches again for the product record every time the calculated specified length changes and the search condition changes.

16. The search device according to claim 15, wherein when the product record is searched again, information indicating an increase/decrease in a number of the searched product records is further displayed in the screen.

17. The search device according to claim 1, wherein the display displays at least one of information on a maximum value of the product size of the product record managed by the product database and information on a minimum value thereof in the screen.

18. The search device according to claim 1, wherein the display displays information on a direction of the specified length under the search condition in the screen.

19. The search device according to claim 1, wherein:
the search unit sets a first range covering the first length, and a second range covering the second length;
the search unit determines whether or not a number of product records having the first product length within the first range is large based on whether or not a preset large-number condition is satisfied; and
the search unit:
(a) takes the product record having the first product length within the first range as a search result when the large-number condition is not satisfied; and
(b) takes the product record having the first product length within the first range and having the second product length within the second range as a search result when the large-number condition is satisfied.

20. The search device according to claim 1, wherein:
the search unit sets a first range covering the first length, and a second range covering the second length;
the search unit determines whether or not a number of product records having the first product length within the first range and the second product length within the second range is much smaller than a number of product records having the first product length within the first range based on whether or not a preset small-number condition is satisfied; and
the search unit:
(a) takes the product record having the first product length within the first range as a search result when the small-number condition is satisfied; and
(b) takes the product record having the first product length within the first range and having the second product length within the second range as a search result when the small-number condition is not satisfied.

21. The search device according to claim 20, wherein:
one of a set of the first direction, the first range, and the first product length, and a set of the second direction, the second range, and the second product length is a set of horizontal direction, a horizontal range, and a product width, and another is a set of a vertical direction, a vertical range and a product height.

22. A search method comprising:
a detecting step for detecting respective positions of a plurality of objects in a real space, the respective positions being positioned based on an intent of a user;
a calculating step for calculating a specified length on a basis of the intent of the user in accordance with the detected positions of the plurality of objects;
a searching step for searching for a product record with a product size satisfying a search condition based on the calculated specified length from a product database managing a product record containing at least the product size and a product image; and
a displaying step for displaying on a screen the product image of the searched product record, wherein:
a number of the plurality of objects is two;
the detecting step comprises detecting, as the respective positions of the plurality of objects, positions in a first direction and positions in a second direction;
the calculating step comprises calculating, as the specified length on the basis of the intent of the user, a first length representing a distance between the two objects in the first direction, and a second length representing a distance between the two objects in the second direction based on the detected positions of the two objects; and the searching step comprises searching for a product record with a product size including a first product length and a second product length, the first product length and the second product length satisfying a search condition based on the calculated first length and the calculated second length.

23. A search device comprising:
a detector configured to detect respective positions of a plurality of objects in a real space, the respective positions being positioned based on an intent of a user;
a calculation unit, implemented by at least one processor, configured to calculate a specified length based on the detected positions of the plurality of objects;
a search unit, implemented by the at least one processor, configured to search for a product record with a product size satisfying a search condition based on the calculated specified length from a product database managing a product record containing at least the product size and a product image; and
a display configured to display on a screen the product image of the searched product record, wherein:
the plurality of objects are respective first and second terminal parts of two users;
distances in a horizontal direction between respective first and second terminal parts of the two users, distances in a vertical direction, and distances in a depth direction are obtained based on detected positions of respective first and second terminal parts of the two users in the horizontal direction, the vertical direction, and the depth direction;
in the obtained distances in the depth direction, a distance in the horizontal direction obtained using the first and second terminal parts based on a smaller distance in the depth direction is calculated as a horizontal length;
in the obtained distances in the depth direction, a distance in the vertical direction obtained using the first and second terminal parts based on the smaller distance in the depth direction is calculated as a vertical length;
a greater distance in the obtained distances in the depth direction is calculated as a depth length;
the product size includes a product width, a product height and a product depth;
the search unit sets a horizontal range covering the horizontal length, sets a vertical range covering the vertical length, and sets a depth range covering the depth length; and
the search unit searches for the product record having the product width within the horizontal range, the product height within the vertical range, and the product depth within the depth range.

24. A search method comprising:
detecting respective positions of a plurality of objects in a real space, the respective positions being positioned based on an intent of a user;
calculating a specified length based on the detected positions of the plurality of objects;
searching for a product record with a product size satisfying a search condition based on the calculated specified length from a product database managing a product record containing at least the product size and a product image; and
displaying on a screen the product image of the searched product record, wherein:
the plurality of objects are respective first and second terminal parts of two users;
distances in a horizontal direction between respective first and second terminal parts of the two users, distances in a vertical direction, and distances in a depth direction are obtained based on detected positions of respective first and second terminal parts of the two users in the horizontal direction, the vertical direction, and the depth direction;
in the obtained distances in the depth direction, a distance in the horizontal direction obtained using the first and second terminal parts based on a smaller distance in the depth direction is calculated as a horizontal length;
in the obtained distances in the depth direction, a distance in the vertical direction obtained using the first and second terminal parts based on the smaller distance in the depth direction is calculated as a vertical length;
a greater distance in the obtained distances in the depth direction is calculated as a depth length;
the product size includes a product width, a product height and a product depth;
the search unit sets a horizontal range covering the horizontal length, sets a vertical range covering the vertical length, and sets a depth range covering the depth length; and
the search unit searches for the product record having the product width within the horizontal range, the product height within the vertical range, and the product depth within the depth range.

25. A search device comprising:
a detector configured to detect respective positions of a plurality of objects in a real space, the respective positions being positioned based on an intent of a user;
a calculation unit, implemented by at least one processor, configured to calculate a specified length based on the detected positions of the plurality of objects;
a search unit, implemented by the at least one processor, configured to search for a product record with a product size satisfying a search condition based on the calculated specified length from a product database managing a product record containing at least the product size and a product image; and
a display configured to display on a screen the product image of the searched product record, wherein:
the display displays, for a predetermined time, an image lag of the product image of the product record excluded from a search result when the search unit starts over searching.

26. A search method comprising:
detecting respective positions of a plurality of objects in a real space, the respective positions being positioned based on an intent of a user;
calculating a specified length based on the detected positions of the plurality of objects;
searching for a product record with a product size satisfying a search condition based on the calculated specified length from a product database managing a product record containing at least the product size and a product image; and
displaying on a screen the product image of the searched product record, wherein:
the displaying comprises displaying, for a predetermined time, an image lag of the product image of the product record excluded from a search result when the search unit starts over searching.

* * * * *